US006846893B1

(12) United States Patent
Sherman et al.

(10) Patent No.: US 6,846,893 B1
(45) Date of Patent: Jan. 25, 2005

(54) POLYMER MIXTURES CONTAINING POLYDIORGANOSILOXANE UREA-CONTAINING COMPONENTS

(75) Inventors: Audrey A. Sherman, St. Paul, MN (US); Mieczyslaw H. Mazurek, Roseville, MN (US); Walter R. Romanko, Woodbury, MN (US); Patrick D. Hyde, Burnsville, MN (US); Roy Wong, White Bear Lake, MN (US); Albert I. Everaerts, Oakdale, MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 45 days.

(21) Appl. No.: 08/735,836

(22) Filed: Oct. 23, 1996

(51) Int. Cl.$^7$ .................................. C08G 18/61
(52) U.S. Cl. ..................... 528/28; 525/106; 525/100; 525/104; 525/105; 525/457; 525/452; 525/458
(58) Field of Search ........................ 528/28; 525/100, 525/104, 106, 105, 457, 452, 458

(56) References Cited

U.S. PATENT DOCUMENTS

| | | | |
|---|---|---|---|
| 2,532,011 A | 11/1950 | Dahlquist et al. .......... 145/53.5 |
| 2,672,182 A | 4/1954 | Daudit et al. ............. 260/448.2 |
| 2,736,721 A | 2/1956 | Dexter ......................... 260/42 |
| 2,814,601 A | 11/1957 | Currie et al. .............. 260/29.1 |
| 2,857,356 A | 10/1958 | Goodwin, Jr. ............... 260/42 |
| 3,528,940 A | 9/1970 | Modic ......................... 260/37 |
| 3,562,352 A | 2/1971 | Nyilas ....................... 260/824 |
| 3,627,851 A | 12/1971 | Brady ........................ 260/825 |
| 3,772,247 A | 11/1973 | Flannigan ................. 260/46.5 |
| 3,890,269 A | 6/1975 | Martin ...................... 260/46.5 |
| 4,002,794 A * | 1/1977 | Schwarcz ................... 525/474 |
| 4,117,192 A | 9/1978 | Jorgensen .................. 428/337 |
| 4,299,874 A | 11/1981 | Jones et al. ................. 428/143 |
| 4,447,493 A | 5/1984 | Driscoll et al. ............. 428/337 |
| 4,490,432 A | 12/1984 | Jordan ....................... 428/220 |
| 4,509,820 A | 4/1985 | Murata et al. ........... 350/96.21 |
| 4,518,758 A | 5/1985 | Cavezzan et al. ............. 528/12 |
| 4,528,343 A * | 7/1985 | Kira ........................... 528/26 |
| 4,539,345 A | 9/1985 | Hansen ....................... 523/215 |
| 4,563,539 A | 1/1986 | Gornowicz et al. ......... 556/421 |
| 4,605,712 A | 8/1986 | Mueller et al. ............. 525/474 |
| 4,661,577 A | 4/1987 | Jo Lane et al. .............. 528/10 |
| 4,675,361 A * | 6/1987 | Ward, Jr. ..................... 525/92 |
| 4,707,531 A | 11/1987 | Shirahata ................... 528/12 |
| 4,736,048 A | 4/1988 | Brown et al. .............. 586/454 |
| 4,774,310 A | 9/1988 | Butler ......................... 528/23 |
| 4,777,276 A | 10/1988 | Rasmussen et al. ........ 556/419 |
| 4,889,753 A | 12/1989 | Brown et al. .............. 428/40 |
| 4,900,474 A | 2/1990 | Terae et al. ................. 252/358 |
| 4,908,208 A | 3/1990 | Lee et al. ................... 424/409 |
| 4,933,396 A | 6/1990 | Leir et al. .................. 525/410 |
| 4,935,484 A | 6/1990 | Wolfgruber et al. .......... 528/34 |
| 4,948,859 A | 8/1990 | Echols et al. ................ 528/28 |
| 4,985,526 A | 1/1991 | Kishita et al. ............... 528/15 |
| 5,026,890 A | 6/1991 | Webb et al. ................ 556/408 |
| 5,028,679 A | 7/1991 | Terae et al. .................. 528/12 |
| 5,091,483 A | 2/1992 | Mazurek et al. ............ 525/477 |
| 5,110,890 A | 5/1992 | Butler ......................... 528/12 |
| 5,118,775 A | 6/1992 | Inomata et al. ............... 528/12 |
| 5,194,113 A | 3/1993 | Lasch et al. ................. 156/243 |
| 5,213,879 A | 5/1993 | Niwa et al. ................. 428/213 |
| 5,214,119 A | 5/1993 | Leir et al. .................... 528/28 |

(List continued on next page.)

FOREIGN PATENT DOCUMENTS

| | | | |
|---|---|---|---|
| DE | 31 43 994 A1 | 5/1983 | |
| EP | 0 250 248 A2 | 12/1987 | ........... C08G/77/42 |
| EP | 0 378 420 A2 | 7/1990 | ........... C08L/83/08 |
| EP | 0 433 070 A2 | 6/1991 | ......... C09D/171/00 |
| EP | 0 455 585 A1 | 11/1991 | ......... C08G/77/388 |
| EP | 0 540 332 A1 | 10/1992 | |
| EP | 0 311 262 | 12/1992 | |
| JP | 2-36234 | 2/1990 | ........... C08G/77/04 |
| JP | 4[1992]-214341 | 8/1992 | |
| WO | WO 95/03354 | 2/1995 | |
| WO | WO 96/34028 | 10/1996 | ........... C08G/18/61 |
| WO | WO 96/34029 | 10/1996 | ........... C08G/18/61 |
| WO | WO 96/34030 | 10/1996 | ........... C08G/18/61 |
| WO | WO 96/10595 | 11/1996 | ........... C08G/18/42 |
| WO | WO 96/35458 | 11/1996 | |

OTHER PUBLICATIONS

M.L. Parin, "Constrained Layer Viscoelastic Vibration Damping", Technical Paper, Society of Manufacturing Engineers (1989).

(List continued on next page.)

*Primary Examiner*—Margaret G. Moore
(74) *Attorney, Agent, or Firm*—Carolyn V. Peters; Jean A. Lown

(57) ABSTRACT

A mixture is provided comprising (a) at least one of an elastomeric thermoplastic, a non-elastomeric thermoplastic, an elastomeric thermoset and mixtures thereof, excluding polydiorganosiloxane fluids and (b) a polymer having soft polydiorganosiloxane units, hard polyisocyanate residue units, optionally, soft and/or hard organic polyamine residue units and terminal groups. The hard polyisocyanate residue and the hard polyamine residue comprise less than 50% by weight of the polydiorganosiloxane urea containing component. The polyisocyanate residue is the polyisocyanate minus the —NCO groups and the polyamine residue is the polyamine minus the —NH$_2$ groups. The polyisocyanate residue is connected to the polyamine residue by urea linkages. The terminal groups are non-functional groups or functional groups. The polydiorganosiloxane urea containing component may be reactive under free-radical or moisture curing conditions. The mixture may also optionally contain tackifying materials, free radical initiators, crosslinking agents, cure catalysts, and nonreactive additives such as fillers, pigments, stabilizers, antioxidants, flame retardants, plasticizers, compatibilizers and the like.

7 Claims, 4 Drawing Sheets

U.S. PATENT DOCUMENTS

| | | | | |
|---|---|---|---|---|
| 5,221,724 A | * | 6/1993 | Li et al. | 528/28 |
| 5,236,997 A | | 8/1993 | Fujiki | 524/12 |
| 5,248,739 A | | 9/1993 | Schmidt et al. | 525/477 |
| 5,262,558 A | | 11/1993 | Kobayashi et al. | 556/453 |
| 5,268,433 A | | 12/1993 | Ikeno et al. | 525/478 |
| 5,276,122 A | | 1/1994 | Aoki et al. | 528/14 |
| 5,279,896 A | | 1/1994 | Tokunaga et al. | 428/355 |
| 5,286,815 A | | 2/1994 | Leir et al. | 525/477 |
| 5,290,615 A | * | 3/1994 | Tushaus et al. | 428/40 |
| 5,302,685 A | | 4/1994 | Tsumura et al. | 528/33 |
| 5,314,748 A | | 5/1994 | Mazurek et al. | 428/345 |
| 5,319,040 A | | 6/1994 | Wengrovius et al. | 525/478 |
| 5,391,015 A | | 2/1995 | Kaczmarczik et al. | 404/14 |
| 5,430,121 A | * | 7/1995 | Pudleiner et al. | 528/28 |
| 5,461,134 A | * | 10/1995 | Leir et al. | 528/14 |
| 5,468,815 A | | 11/1995 | Boardman et al. | 525/478 |
| 5,512,650 A | | 4/1996 | Leir et al. | 528/14 |
| 5,539,033 A | | 7/1996 | Bredahl et al. | 525/270 |
| 5,589,563 A | * | 12/1996 | Ward et al. | 528/44 |
| 5,663,227 A | * | 9/1997 | Birkholz et al. | 524/262 |
| 5,670,598 A | * | 9/1997 | Leir et al. | 528/28 |
| 5,728,469 A | * | 3/1998 | Mann et al. | 428/418 |
| 6,407,195 B2 | | 6/2002 | Sherman et al. | |
| 6,664,359 B1 | | 12/2003 | Kangas et al. | |

OTHER PUBLICATIONS

I. Yilgor et al., "Segmented Organosiloxane Copolymers. 1. Synthesis—Urea Copolymers", Polymer, vol. 25, (Dec. 1984) pp. 1800–1806.

D. Tyagi et al., "Segmented Organosiloxane Copolymers: 2 Thermal and Mechanical Properties of Siloxane—Urea Copolymers", Polymer, vol. 25 (Dec. 1984) pp. 1807–1816.

D. Tyagi et al. "Solid State Properties of Segmented Polysiloxane Thermoplastic Elastomer Copolymers", Polymer Preprints, vol. 24, No. 2 (Aug. 1983) pp. 39–40.

E.J. Neilsen et al., "Viscoelastic Damper Overview for Seismic & Wind Applications," Structural Engineering Assm. Of California, Tahoe Olympiad (Oct. 1994).

Encyclopedia of Polymer Science & Engineering, vol. 15, John Wiley & Sons New York (1989) pp. 265–270.

M. Kendig et al., Corrosion, vol. 46, No. 1, pp. 2–29 (1990).

"Standard Test Mode for Rubber Properties in Tension", ASTM Designation: D 412–80.

* cited by examiner

POLYMER MIXTURES CONTAINING POLYDIORGANOSILOXANE UREA-CONTAINING COMPONENTS

TECHNICAL FIELD

This invention relates to a mixture of a polydiorganosiloxane urea-containing material and an organic polymer, in particular to mixtures that are useful as plastics, release surfaces, pressure-sensitive adhesives, hot melt adhesives, vibration damping compositions, as well as articles made from such mixtures.

BACKGROUND OF THE INVENTION

Polydiorganosiloxane polymers have unique properties derived mainly from the physical and chemical characteristics of the siloxane bond and the organic substituents. Typically, the outstanding properties of polydiorganosiloxane polymers include resistance to ultraviolet light, extremely low glass transition temperature, good thermal and oxidative stability, good permeability to many gases, very low surface energy, low index of refraction, good hydrophobicity, and good dielectric properties. They also have very good biocompatibility and are of great interest as biomaterials which can be used in the body in the presence of blood. Polydiorganosiloxane elastomers have been widely used because of these many excellent properties. But, their limited tear resistance and poor resistance to low polarity solvents have made them unsuitable in many other applications.

In recent years, free radically curable and moisture curable liquid polydiorganosiloxane compositions have been disclosed that cure rapidly and completely under exposure to radiation, moderately elevated temperatures, or moisture with excellent properties. Thus, subsequent manufacturing or repair steps wherein these compositions are used are often delayed until some degree of curing occurs. Also, thick constructions cannot be made without temporary support until curing is accomplished, and irregularly shaped surfaces can be difficult to coat adequately. Therefore, there is still a need for polydiorganosiloxane compositions with green strength, i.e., strength in the uncured state, and controlled flow properties.

Polydiorganosiloxane segmented copolymers is polydiorganosiloxane urea containing components which may contain blocks other than polydiorganosiloxane or urea. These copolymers have some potential process economy advantages because their synthesis reaction is more rapid than those previously mentioned, requires no catalyst, and produces no by-products.

Traditionally, polydiorganosiloxane pressure-sensitive adhesives have been made in solution. Conventional solvent based polydiorganosiloxane pressure-sensitive adhesives are generally blends of high molecular weight silanol functional polydiorganosiloxanes, i.e., polydiorganosiloxane gums, and copolymeric silanol functional silicate resin, i.e., MQ resins, which comprise $R_3SiO_{1/2}$ units and $SiO_{4/2}$ units. Improvements in such pressure-sensitive adhesive properties are achieved when the copolymeric polydiorganosiloxane resin and polydiorganosiloxane are intercondensed, providing intra- and inter-condensation within the adhesive. This condensation step requires 1) the addition of a catalyst, 2) reacting the copolymeric polydiorganosiloxane resin and polydiorganosiloxane in solution, and 3) allowing the reaction to take place over a period of time at elevated temperature.

Solution polymerized polydiorganosiloxane urea elastomers that do not require a cure step have been described. However, because these compositions are made in solvent, they can have costly handling procedures.

Continuous melt polymerization processes are advantageous and have been used to make compositions such as polyurethane elastomers and acrylate pressure sensitive adhesives. A continuous melt polymerization process for producing polyetherimides, which can contain polydiorganosiloxane segments, has also been described. Recently, polyurethane resins have been described which use polydiorganosiloxane urea segments to prevent blocking of film formed from the resin. However, levels of reactive polydiorganosiloxane in the compositions were small, for example, less than 15 weight percent, and potential incomplete incorporation of the polydiorganosiloxane into the backbone was not detrimental since easy release was the intent. Unincorporated polydiorganosiloxane oil can, however, act as a plasticizing agent in elastomers to reduce tensile strength or detackify and reduce shear properties of pressure-sensitive adhesives. This unincorporated oil can also bloom to the surface of an elastomer or adhesive and contaminate other surfaces with which it is in contact.

Mixtures of polymeric components have also been used in various applications. Enhanced peel adhesion performance has been seen when acrylic pressure-sensitive adhesives have been melt mixed with thermoplastic elastomers and subsequently extrusion coated onto various substrates. Polydiorganosiloxane urea has been mixed in solvent with dielectric polymers to form dielectric layers for the imaging sheets of an electrostatic printing process that releases more easily from later applied toners. However, good images result only when the polydiorganosiloxane urea contains a non-polydiorganosiloxane hard segment of at least 50 weight percent.

SUMMARY OF THE INVENTION

Briefly in one aspect of the invention, a mixture is provided comprising (a) at least one of thermoplastic, an elastomeric thermoset and mixtures thereof, excluding polydiorganosiloxane fluids and (b) a polymer having soft polydiorganosiloxane units, hard polyisocyanate residue units, optionally, soft and/or hard organic polyamine residue units and terminal groups. The hard polyisocyanate residue and the hard polyamine residue comprise less than 50% by weight of the polydiorganosiloxane urea containing component. The polyisocyanate residue is the polyisocyanate minus the —NCO groups and the polyamine residue is the polyamine minus the —NH$_2$ groups. The polyisocyanate residue is connected to the polyamine residue by urea linkages. The terminal groups are non-functional groups or functional groups. The polydiorganosiloxane urea containing component may be reactive under free-radical or moisture curing conditions. The mixture may also optionally contain tackifying materials, free radical initiators, crosslinking agents, cure catalysts, and nonreactive additives such as fillers, pigments, stabilizers, antioxidants, flame retardants, plasticizers, compatibilizers and the like.

For convenience, hereinafter "a thermoplastic polymer, an elastomeric thermoset polymer and mixtures thereof, excluding polydiorganosiloxane fluids" will also be referred to as "an organic polymer".

The invention also provides an essentially solventless process for producing a mixture that includes an organic polymer and a polydiorganosiloxane urea containing component. The typical three step process comprises (1) continuously providing at least one organic polymer and at least one polydiorganosiloxane urea containing component to a vessel, (2) mixing the components to form a mixture and (3) conveying the mixture from the vessel.

Alternatively, the present invention can be practiced in a minimum of four steps comprising (1) providing at least one organic polymer and reactant components wherein the reactant components include at least one polyisocyanate and at least one polyamine and the polyamine comprises at least one polydiorganosiloxane amine or a mixture of at least one polydiorganosiloxane amine and at least one organic amine, (2) mixing the components, (3) allowing the reactant components to react to form a polydiorganosiloxane urea segmented copolymer that is non-functional or that can be further reacted under moisture-cure or free-radical conditions and (4) conveying the mixture from the reactor. While the recitation of the steps indicate that the organic polymer and the reactant components are provided in a single step and mixed in a separate step, if is understood that any order of these additions and mixing can occur depending upon whether the organic polymer(s) are reactive or unreactive with isocyanate or amine. If the organic polymer is considered unreactive, that is, the reaction rate of the organic polymer with isocyanate or amine is significantly less than the reaction rate of isocyanate with amine so as to not substantially compete with the reaction between the isocyanate and the amine, then the organic polymer may be added to the reactor in any order relative to the reactant components. On the other hand, if the organic polymer is reactive with the reactant components, that is, the organic polymer is significantly reactive with isocyanate or amine so as to substantially compete with the reaction between the isocyanate and the amine, then organic polymer is added preferably after the reactant components have first reacted to form a polydiorganosiloxane urea containing component. This mixing process may either be a continuous process or a batch process.

In yet another aspect, the invention provides a mixture comprising an organic polymer and a polydiorganosiloxane urea containing component that is obtainable using an essentially solventless mixing process.

Also provided in the present invention are various articles using the mixtures as coatings or layers and such articles include but are not limited to vibration damping articles, pressure-sensitive and hot-melt adhesive articles, films, coatings, articles with release surfaces, and articles with matte appearing surfaces.

Advantageously, a number of compositions and articles are possible with the present invention because polydiorganosiloxanes and most other polymers are generally incompatible and have not been known to form useful mixtures when significant concentrations of polydiorganosiloxane are present. Unexpectedly, methods of making useful mixtures containing a wide range of polydiorganosiloxane concentrations have been provided in this invention. The compositions combine the useful low temperature and low surface energy properties of polydiorganosiloxanes with the useful ambient temperature properties of other organic polymers. For example, vibration damping materials prepared with the mixtures of the present invention exhibit more varied damping characteristics and improved adhesion to various surfaces over more conventional damping materials. Heretofore unknown release coatings have been made having a range of release properties, a glossy or matte appearing surface and better adhesion to a number of substrates. Further, the present invention provides pressure-sensitive adhesives that permit tailored adhesive performance combining polydiorganosiloxane properties and other polymer material properties, unknown to those skilled in the art prior to the present invention. Also new adhesives are now possible for controlling the rate of the delivery of a drug into skin that have a wider variety of properties than previously obtainable with known polydiorganosiloxane urea containing compositions.

DESCRIPTION OF THE PREFERRED EMBODIMENT(S)

Figure 1:
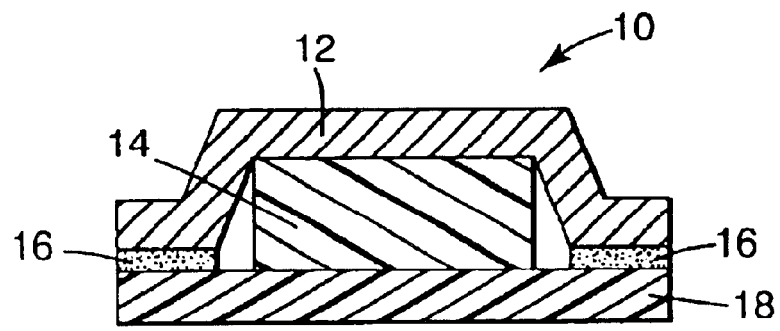
FIG. 1 is a cross-sectional view of a transdermal matrix device of the present invention.

Briefly, in one aspect of the invention, a mixture is provided comprising (a) at least one of a thermoplastic, a thermoset elastomer and mixtures thereof, excluding polydiorganosiloxane fluids and (b) a polymer having soft polydiorganosiloxane units, hard polyisocyanate residue units, optionally, soft and/or hard organic polyamine residue units and terminal groups. The hard polyisocyanate residue and the hard polyamine residue comprise less than 50% by weight of the polydiorganosiloxane urea containing component. The polyisocyanate residue is the polyisocyanate minus the —NCO groups and the polyamine residue is the polyamine minus the —NH$_2$ groups. The polyisocyanate residue is connected to the polyamine residue by urea linkages. The terminal groups are non-functional groups or functional groups. The mixture may also optionally contain tackifying materials, endcapping agents, free radical initiators, silane crosslinking agents, moisture cure catalysts, and nonreactive additives such as fillers, pigments, stabilizers, antioxidants, flame retardants, plasticizers, compatibilizers and the like.

Organic Polymer Component

The organic polymer component is a thermoplastic, a thermoset elastomer and mixtures thereof, excluding polydiorganosiloxane fluids.

The organic polymer may be solvent or melt mixed with the polydiorganosiloxane urea segmented copolymer. Also, the organic polymer may be another polydiorganosiloxane urea containing component or a polymer that does not contain polydiorganosiloxane segments. At use temperature the mixtures generally have at least two domains, one discontinuous and the other continuous, because of the general immiscibility of the polydiorganosiloxane urea containing component with the organic polymer. Of course, the mixture may contain more than one organic polymer.

Thermoplastic materials are generally materials that flow when heated sufficiently above their glass transition point and become solid when cooled. They may also have elastomeric properties. Thermoplastic materials useful in the present invention that are generally considered non-elastomeric include, for example, polyolefins such as isotactic polypropylene, low density polyethylene, linear low density polyethylene, very low density polyethylene, medium density polyethylene, high density polyethylene, polybutylene, non-elastomeric polyolefin copolymers or terpolymers, such as ethylene/propylene copolymer and blends thereof; ethylene-vinyl acetate copolymers such as ELVAX™ 260, available from DuPont Chemical Co.; ethylene acrylic acid copolymers; ethylene methacrylic acid copolymers such as SURLYN™ 1702, available from DuPont Chemical Co.; polymethylmethacrylate; polystyrene; ethylene vinyl alcohol; polyester; amorphous polyester; polyamides; fluorinated thermoplastics, such a polyvinylidene fluoride, polytetrafluoroethylene, fluorinated ethylene/propylene copolymers and fluorinated ethylene/propylene copolymers; halogenated thermoplastics, such as a chlorinated polyethylene. Any single thermoplastic material can be mixed with at least one polydiorganosiloxane urea containing component. Alternatively, a mixture of thermoplastic materials may be used.

Thermoplastic materials that have elastomeric properties are typically called thermoplastic elastomeric materials. Thermoplastic elastomeric materials are generally defined as materials that act as though they were covalently cross-linked, exhibiting high resilience and low creep, yet flow when heated above their softening point. Thermoplastic elastomeric materials useful in the present invention include, for example, linear, radial, star and tapered styrene-isoprene block copolymers such as KRATON™ D1107P, available from Shell Chemical Co. of Houston, Tex. and EUROPRENE™ SOL TE 9110, available from EniChem Elastomers Americas, Inc. of Houston, Tex.; linear styrene-(ethylene-butylene) block copolymers such as KRATON™ G1657, available from Shell Chemical Co.; linear styrene-(ethylene-propylene) block copolymers such as KRATON™ G1657X, available from Shell Chemical Co.; linear, radial, and star styrene-butadiene block copolymers such as KRATON™ D 1118X, available from Shell Chemical Co. and EUROPRENE™ SOL TE 6205, available from EniChem Elastomers Americas, Inc.; polyetheresters such as HYTREL™G3548, available from DuPont, elastomeric ethylene-propylene copolymers; thermoplastic elastomeric polyurethanes such as MORTHANE URETHENE™ PE44-203, available from Morton International, Inc., Chicago, Ill.; self-tacky or tackified polyacrylates including $C_3$ to $C_{12}$ alkylesters that may contain other comonomers, such as for example, isooctyl acrylate and from 0 to 20 weight percent acrylic acid; polyvinylethers; poly-α-olefins based thermoplastic elastomeric materials such as those represented by the formula —($CH_2$ $CHR)_R$ where R is an alkyl group containing 2 to 10 carbon atoms and poly-α-olefins based on metallocene catalysis such as ENGAGE™ EG8200, an ethylene/poly-α-olefin copolymer available from Dow Plastics Co. of Midland, Mich.

Thermoset elastomers are materials that change irreversibly under the influence of heat from a fusible and soluble material into one that is infusible and insoluble through the formation of a covalently cross-linked, thermally stable network. Thermoset elastomers useful in the present invention include, for example, natural rubbers such as CV-60, a controlled viscosity grade available from Goodyear Chemical, Akron, Ohio, and SMR-5, a ribbed smoked sheet rubber; butyl rubbers, such as Exxon Butyl 268 available from Exxon Chemical Co.; synthetic polyisoprenes such as CARIFLEX™IR309, available from Royal Dutch Shell of Netherlands and NATSYN™ 2210, available from Goodyear Tire and Rubber Co.; styrene-butadiene random copolymer rubbers such as AMERIPOL™ 1011A, available from BF Goodrich of Akron, Ohio; polybutadienes; polyisobutylenes such as VISTANEX™ MM L-80, available from Exxon Chemical Co.; polyurethanes such as, for example, polyoctadecyl carbamate disclosed in U.S. Pat. No. 2,532,011; amorphous poly-α-olefins such as $C_4$–$C_{10}$ linear or branched poly-α-olefins; polydiorganosiloxane urea containing components, such as those disclosed in U.S. Pat. No. 5,214,119.

The thermoplastic or thermoset elastomers materials can be modified with tackifying materials or plasticizers to modify their properties. Tackifying materials or plasticizers useful with the polymeric materials are preferably miscible at the molecular level, i.e., soluble in, any or all of the polymeric segments of the elastomeric material or the thermoplastic elastomeric material. These tackifying materials or plasticizers are generally immiscible with the polydiorganosiloxane urea containing component. When the tackifying material is present it generally comprises about 5 to 300 parts by weight, more typically up to about 200 parts by weight, based on 100 parts by weight of the polymeric material. Examples of tackifiers suitable for the invention include but are not limited to liquid rubbers, hydrocarbon resins, rosin, natural resins such as dimerized or hydrogenated balsams and esterified abietic acids, polyterpenes, terpene phenolics, phenol-formaldehyde resins, and rosin esters. Examples of plasticizers include but are not limited to polybutene, paraffinic oils, petrolatum, and certain phthalates with long aliphatic side chains such as ditridecyl phthalate.

Polydiorganosiloxane Urea-Containing Component

In general, the component can be described as a material having soft polydiorganosiloxane units, hard polyisocyanate residue units, terminal groups and optionally soft and/or hard organic polyamine residue units. The polyisocyanate residue is the polyisocyanate minus the —NCO groups, the organic polyamine residue is the organic polyamine minus the —NH groups, and the polyisocyanate residue is connected to the polydiorganosiloxane units or organic polyamine residues by urea linkages. The terminals groups may be non-functional groups or functional groups depending on the purpose of the polydiorganosiloxane urea segmented copolymer.

The polydiorganosiloxane urea containing components of the invention can be represented by the repeating unit:

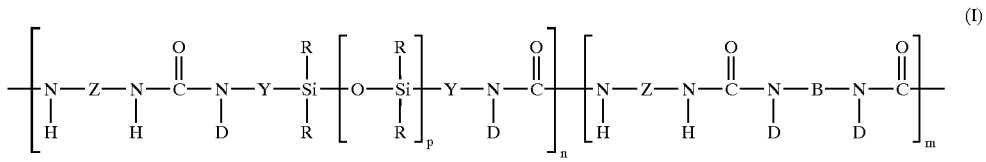

where:
each R is a moiety that independently is an alkyl moiety preferably having about 1 to 12 carbon atoms and may be substituted with, for example, trifluoroalkyl or vinyl groups, a vinyl radical or higher alkenyl radical preferably represented by the formula —$R^2$ $(CH_2)_a CH = CH_2$ wherein $R^2$ is —$(CH_2)_b$— or —$(CH_2)_c CH = CH$— and a is 1, 2 or 3; b is 0, 3 or 6; and c is 3, 4 or 5, a cycloalkyl moiety having about 6 to 12 carbon atoms and may be substituted with alkyl, fluoroalkyl, and vinyl groups, or an aryl moiety preferably having about 6 to 20 carbon atoms and may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroether-containing group, as described in U.S. Pat. No. 4,900,474 and U.S. Pat. No. 5,118,775, wherein such descriptions are incorporated herein by reference; preferably at least 50% of the R moieties are methyl radicals with the balance being monovalent alkyl or substituted alkyl radicals having 1 to 12 carbon atoms, alkenylene radicals, phenyl radicals, or substituted phenyl radicals;

each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical preferably having 1 to 10 carbon atoms, an aralkylene radical or an arylene radical preferably having 6 to 20 carbon atoms;

each D is independently selected from the group consisting of hydrogen, an alkyl radical of 1 to 10 carbon atoms, phenyl, and a radical that completes a ring structure including B or Y to form a heterocycle;

B is a polyvalent radical selected from the group consisting of alkylene, aralkylene, cycloalkylene, phenylene, polyalkylene oxide, including for example, polyethylene oxide, polypropylene oxide, polytetramethylene oxide, and copolymers and mixtures thereof;

m is a number that is 0 to about 1000;
n is a number that is equal to or greater than 1; and
p is a number that is about 5 or larger, preferably about 15 to 2000, more preferably about 30 to 1500.

In the use of polyisocyanates (Z is a radical having a functionality greater than 2) and polyamines (B is a radical having a functionality greater than 2), the structure of Formula I will be modified to reflect branching at the polymer backbone. In the use of polyisocyanates (Z is a radical of functionality greater than 2) and polyamines (B is a radical of functionality greater than 2), the structure of Formula I will be modified to reflect branching at the polymer backbone.

In the use of endcapping agents, the structure of Formula I will be modified to reflect termination of the polydiorganosiloxane urea chain.

Tackifying materials for the polydiorganosiloxane urea containing component, generally silicate resins, can also be added. The silicate resin plays an important role in determining the physical properties of the polydiorganosiloxane urea containing component of the present invention. For example, as silicate resin content is increased from low to high concentration the glassy to rubbery transition of the polydiorganosiloxane urea containing component occurs at increasingly higher temperatures. Thus, varying silicate resin concentration in vibration damping applications shifts the area of maximum damping of that component to the desired temperature range to suitably complement a damping range of the organic polymer of the mixture of the invention. Of course the M to Q ratio, D and T content, and molecular weight of resins may significantly influence the relative "hardness" of the resin and must be considered when selecting resin type and concentration. Furthermore, one need not be limited to a single silicate resin as it may be beneficial to employ a combination of resins in a single composition to achieve desired performance.

The silicate resins useful in the present invention include those resins composed of the following structural units M, D, T, and Q, and combinations thereof. Typical examples include MQ silicate resins, MQD silicate resins, and MQT silicate resins which also may be referred to as copolymeric silicate resins and which preferably have a number average molecular weight of about 100 to about 50,000, more preferably about 500 to about 10,000 and generally have methyl substituents. The silicate resins also include both nonfunctional and functional resins, the functional resins having one or more functionalities including for example, silicon-bonded hydrogen, silicon-bonded alkenyl, and silanol. MQ silicate resins are copolymeric silicate resins having $R'_3SiO_{1/2}$ units and $SiO_{4/2}$ units. Such resins are described in, for example, *Encyclopedia of Polymer Science and Engineering*, vol. 15, John Wiley & Sons, New York, (1989), pp 265–270, and U.S. Pat. No. 2,676,182, U.S. Pat. No. 3,627,851, U.S. Pat. No. 3,772,247, and U.S. Pat. No. 5,248,739, wherein such descriptions are incorporated herein by reference. MQ silicate resins having functional groups are described in U.S. Pat. No. 4,774,310 that has silyl hydride groups, U.S. Pat. No. 5,262,558 that has vinyl and trifluoropropyl groups, and U.S. Pat. No. 4,707,531 that has silyl hydride and vinyl groups, wherein the description from each reference is incorporated herein by reference. The above-described resins are generally prepared in solvent. Dried, or solventless, MQ silicate resins can be prepared, as described in U.S. Pat. No. 5,319,040, U.S. Pat. No. 5,302, 685, and U.S. Pat. No. 4,935,484, wherein such descriptions are incorporated herein by reference. MQD silicate resins are terpolymers having $R'_3SiO_{1/2}$ units, $SiO_{4/2}$ units, and $R'_2SiO_{2/2}$ units such as are taught in U.S. Pat. No. 2,736,721 wherein such description is incorporated herein by reference. MQT silicate resins are terpolymers having $R'_3SiO_{1/2}$ units, $SiO_{4/2}$ units and $R'SiO_{3/2}$ units such as are taught in U.S. Pat. No. 5,110,890 wherein such description is incorporated herein by reference and Japanese Kokai HE 2-36234.

Commercially available silicate resins include SR-545, MQ resin in toluene, available from General Electric Co., Silicone Resins Division, Waterford, N.Y.; MQOH resins, which are MQ resins available from PCR, Inc. Gainesville, Fla.; MQR-32-1, MQR-32-2, and MQR-32-3 which are MQD resins in toluene, available from Shin-Etsu Silicones of America, Inc., Torrance, Calif., and PC-403 a hydride functional MQ resin in toluene available from Rhone-Poulenc, Latex and Specialty Polymers, Rock Hill, S.C. Such resins are generally supplied in organic solvent and may be employed in compositions of the present invention as received. However, these organic solutions of silicate resin may also be dried by any number of techniques known in the art, such as spray drying, oven drying and the like, or steam separation to provide a silicate resin at substantially 100% nonvolatile content for use in compositions of the present invention. Also useful in polydiorganosiloxane urea containing components of the present invention are blends of two or more silicate, resins. In addition or in place of the silicate resins, organic tackifiers, similar to those listed earlier as useful with the organic polymer, may be used with the component when a substantial portion of the polydiorganosiloxane urea containing component is other than polydiorganosiloxane.

When a tackifying material is included in the polydiorganosiloxane urea containing component of the mixture of the invention, that component preferably contains about 1 to 80 parts by weight tackifying material and more preferably about 15 to 75 parts by weight tackifying material. When the tackifying material is added to only the polydiorganosiloxane urea containing component to reinforce the elastomer, most preferably the tackifying material comprises between about 15 and 25 parts by weight of this component. When the tackifying material is added to the polydiorganosiloxane urea containing component to form a combination that is an adhesive or a damper, most preferably the tackifying material comprises between about 30 to 70 parts by weight of the combination. The total parts by weight of the polydiorganosiloxane urea containing component and the silicate resin in the combination equal 100. The optimum amount of tackifying material depends on such factors as the type and amount of reactants used, the molecular weight of the hard and soft segments of the polydiorganosiloxane urea segmented copolymer, the type and amount of the organic polymer, and the intended use of the composition of the invention.

Other Additives

Fillers, plasticizers, and other property modifiers may be incorporated in the organic polymer, the polydiorganosiloxane urea segmented organic polymer or both of the components of the composition of the present invention. Fillers such as fumed silica, carbon fibers, carbon black, glass beads, glass bubbles, glass fibers, mineral fibers, clay particles, organic fibers, e.g., nylon, KEVLAR™, metal particles, and the like which can be added in amounts up to about 100 parts per 100 parts of the sum of the organic polymer and the polydiorganosiloxane urea segmented polymeric component, provided that if and when incorporated, such additives are not detrimental to the function and functionality of the final polymer product. Other additives such as dyes, pigments, flame retardants, stabilizers, antioxidants, compatibilizers, antimicrobial agents such as zinc oxide, electrical conductors, thermal conductors such as aluminum oxide, boron nitride, aluminum nitride, and nickel particles, and the like can be blended into these systems in amounts of from about 1 to 50 volume percent of the composition of the invention.

Reactive Components of the Polydiorganosiloxane Urea Containing Component

Different polyisocyanates in the reaction will modify the properties of the polydiorganosiloxane urea containing component in varying ways. For example, if a polycarbodiimide-modified diphenylmethane diisocyanate, such as ISONATE™ 143L, available from Dow Chemical Co., is used, the resulting polydiorganosiloxane urea containing component has enhanced solvent resistance when compared with copolymers prepared with other diisocyanates. If tetramethyl-m-xylylene diisocyanate is used, the resulting segmented copolymer has a very low melt viscosity that makes it particularly useful for injection molding.

Diisocyanates useful in the process of the present invention can be represented by the formula

$$OCN-Z-NCO \qquad (II)$$

Any diisocyanate that can react with a polyamine, and in particular with polydiorganosiloxane diamine of Formula II can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate. Particularly preferred is tetramethyl-m-xylylene diisocyanate. Polydiorganosiloxane urea containing components produced using tetramethyl-m-xylylene diisocyanate generally have lower melt viscosities than similar copolymers produced using other diisocyanates, and a higher modulus.

Any triisocyanate that can react with a polyamine, and in particular with polydiorganosiloxane diamine of Formula II, can be used in the present invention. Examples of such triisocyanates include, but are not limited to, polyfunctional isocyanates, such as those produced from biurets, isocyanurates, adducts and the like. Some commercially available polyisocyanates include portions of the DESMO-DUR™ and MONDUR™ series from Bayer and the PAPI™ series of Dow Plastics.

Preferred triisocyanates include DESMODUR™ N-3300 and MONDUR™ 489.

Polydiorganosiloxane diamines useful in the process of the present invention can be represented by the formula

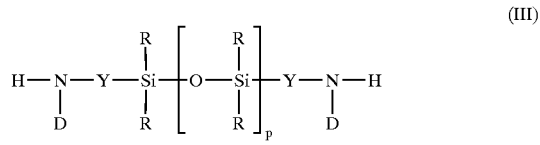

(III)

wherein each of R, Y, D, and p are defined as above. Generally, the number average molecular weight of the polydiorganosiloxane diamines useful in the present invention are greater than about 700.

Polydiorganosiloxane diamines (also referred to as silicone diamines) useful in the present invention are any which fall within Formula VIII above and including those having molecular weights in the range of about 700 to 150,000. Polydiorganosiloxane diamines are disclosed, for example, in U.S. Pat. No. 3,890,269, U.S. Pat. No. 4,661,577, U.S. Pat. No. 5,026,890, U.S. Pat. No. 5,214,119, U.S. Pat. No. 5,276,122, U.S. Pat. No. 5,461,134 and U.S. Pat. No. 5,512,650, each of which is incorporated herein by reference.

Polydiorganosiloxane diamines are commercially available from, for example, Shin Etsu Silicones of America, Inc., Torrance, Calif., and Hills America, Inc. Preferred are substantially pure polydiorganosiloxane diamines prepared as disclosed in U.S. Pat. No. 5,214,119 which is incorporated herein by reference. The polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650.

Examples of polydiorganosiloxane diamines useful in the present invention include but are not limited to polydimethylsiloxane diamine, polydiphenylsiloxane diamine, poly trifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof.

Examples of organic polyamines useful in the present invention include but are not limited to polyoxyalkylene diamine, such as D-230, D-400, D-2000, D-4000, DU-700, ED-2001 and EDR-148, all available from Huntsman, polyoxyalkylene triamine, such as T-3000 and T-5000 available from Huntsman, polyalkylenes, such as DYTEK™ A and DYTEK™ EP, available from DuPont and mixtures thereof.

Once the reaction of the polyisocyanate with the polyamine has occurred, active hydrogens in the urea linkage may still be available for reaction with excess isocyanate. By increasing the ratio of isocyanate to amine, the formation of biuret moieties may be facilitated, especially at higher temperatures, resulting in branched or crosslinked polymer. Low to moderate amounts of biuret formation can be advantageous to shear properties and solvent resistance.

The nature of the isocyanate residue in the polydiorganosiloxane urea containing component influences stiffness and flow properties, and also affects the properties of the mixtures. Isocyanate residues resulting from diisocyanates that form crystallizable ureas, such as tetramethyl-m-xylylene diisocyanate, 1,12-dodecane diisocyanate, dianisidine diisocyanate, provide mixtures that can be stiffer, if sufficient polydiorganosiloxane urea containing component is used, than those prepared from methylenedicyclohexylene-4,4'-diisocyanate, 3-isocyanatomethyl-3,5,5-trimethylcyclohexyl isocyanate, and m-xylylene diisocyanate.

Optional endcapping agents may be incorporated, as needed, to introduce non-functional moisture curable or free radically curable moieties into the polydiorganosiloxane urea containing component. The agents are reactive with either amines or isocyanates.

Crosslinking agents, if desired may be used, for example silane agents may be used to crosslink moisture curable polydiorganosiloxane urea containing components or photoinitiators can be used for free-radically curable polydiorganosiloxanes urea containing component. When used, the amounts of such components are those that are suitable for the purpose intended and are typically used at a concentration of from about 0.1% to about 5% by weight of the total polymerizable composition.

Processes of Making

The compositions and constructions of the present invention can be made by solvent-based processes known to the art, by a solventless process or by a combination of the two. One skilled in the art can expect the optimum material for a particular application to be a function of the architecture and ratios of the polydiorganosiloxane urea containing component, the architecture and ratios of organic polymer, optional initiator architecture, and whether any fillers, additives, or property modifiers are added. In addition, compositions having very different properties can be obtained depending on which method is used. Also, the polydiorganosiloxane urea containing component can be either made before it is mixed with the organic polymer or the polydiorganosiloxane urea containing component can be made in the presence of the organic polymer. If the latter occurs, the organic polymer must be unreactive to amines or isocyanates, that is, the reaction rate of the organic polymer with the isocyanate or amine is significantly less than the reaction rate of isocyanate with amine so as to not substantially compete with the reaction between the isocyanate and the amine.

Solvent-based processes are well known in the art. Examples of solvent-based processes by which the polydiorganosiloxane urea containing component useful in the present invention can be prepared include: Tyagi et al., "Segmented Organosiloxane Copolymers: 2. Thermal and Mechanical Properties of Siloxane-Urea Copolymers," Polymer, vol. 25, December, 1984 and U.S. Pat. No. 5,214,119 (Leir et al.) which are incorporated herein by reference. The organic polymer can then be added to the solvent solution of the polydiorganosiloxane urea segmented polymer to form the composition useful as, for example, release surfaces, gaskets, sealants and potting compounds. If tackifying material is added, resulting mixtures have utility in the constructions and methods of bonding, corrosion protection, or vibrationally damping an article of the present invention.

Another particularly useful process for making mixtures of the invention is a solventless process. The polydiorganosiloxane urea containing component is either made before the polymer component is added to form the mixture or made in the presence of the organic polymer. In either case, any reactor is suitable for use when the polydiorganosiloxane urea containing component is made under substantially solventless conditions as long as the reactor can provide intimate mixing of the isocyanate reactant component and the amine reactant component of the reaction. The reaction may be carried out as a batch process using, for example, a flask equipped with a mechanical stirrer, provided the product of the reaction has a sufficiently low viscosity at the processing temperature to permit mixing. In addition, the reaction may be carried out as a continuous process using, for example, a single screw or twin screw extruder. Preferably, the reactor is a wiped surface counter-rotating or co-rotating twin screw extruder. Most preferably, the reactor is a wiped surface reactor having relatively close clearances between the screw flight lands and the barrel, with this value typically lying between 0.1 to about 2 mm. The screws utilized are preferably fully or partially intermeshing or fully or partially wiped in the zones where a substantial portion of the reaction takes place. Total residence time in a vessel to make the polydiorganosiloxane urea containing component typically varies from about 5 seconds to 20 minutes, more typically from about 15 seconds to 8 minutes. The reaction between the isocyanate and amine reactants is fast and can occur at room temperature. Thus, the formation of the polydiorganosiloxane urea containing component can easily take place, for example, in as little as one 5:1 length to diameter unit of a twin screw extruder. Temperatures between 140 and 250° C. are generally sufficient to transport the polydiorganosiloxane urea containing component from the vessel.

The ability to eliminate the presence of solvent during the reaction of polyamine and polyisocyanate yields a much more efficient reaction. The average residence time using the process of the present invention is typically 10 to 1000 times shorter than that required in solution polymerization. A small amount of non-reactive solvent can be added, if necessary, for example, from about 0.5% up to about 5% of the total composition, in this process either as a carrier for injecting otherwise solid materials or in order to increase stability of an otherwise low flow rate stream of material into the reaction chamber.

Rates of addition are also important, particularly when the polydiorganosiloxane urea containing reactants are used. Because of the rapid reaction which occurs between the polyamine and the polyisocyanate, both reactants are preferably fed into an extruder at unvarying rates, particularly when using higher molecular weight polyamines, i.e., with molecular weights of about 50,000 and higher. Such feeding generally reduces undesirable variability of the final product. One method of ensuring the continuous feeding into the extruder when a very low flow polyisocyanate stream is to allow the polyisocyanate feed line to touch or very nearly touch the passing threads of the screws. Another method would be to utilize a continuous spray injection device which produces a continuous stream of fine droplets of the polyisocyanates into the reactor.

Polydiorganosiloxane urea containing components can be made having higher molecular weight than possible with a solvent process. Polydiorganosiloxane urea containing components made with polydiorganosiloxane diamines having molecular weights over 20,000 often do not achieve the degree of conversion in solvent processes that are obtainable in solventless processes.

The organic polymer is generally added as a molten stream to the polydiorganosiloxane urea containing component or to one of the reactants of the polydiorganosiloxane urea containing component. Sometimes the polymeric material needs to be melted in a separate vessel before the polydiorganosiloxane urea containing component is added (1) as pellets, (2) as reactants or (3) as a separate molten stream from a second vessel. Examples when a separate vessel is preferred include, for example, when (1) additives are preferred to concentrate in the organic polymer, (2) organic polymers need high processing temperatures and (3) organic polymers include elastomeric thermoset materials.

The order of adding the various components is important in forming the mixture. If the organic polymer is substantially unreactive with polyisocyanates and polyamines as discussed earlier, any order of addition can be used. The polydiorganosiloxane urea containing component can be added to the organic polymer, and vice versa, or the polydiorganosiloxane urea containing component can be made in the presence of the organic polymer. However, the organic polymer must be added after the polydiorganosiloxane urea containing component is formed if the organic polymer is reactive to isocyanate or amines. Also, the organic polymer is preferably sufficiently heated to a processable state in a separate vessel and added to a molten stream of the polydiorganosiloxane urea containing component if the temperature needed to process the organic polymer would degrade the polydiorganosiloxane urea containing component. Other additives such as plasticizing materials, tackifying materials, pigments, fillers, initiators, and the like can generally be added at any point in the process since they are usually not reactive with the reactants but are typically added after a substantial amount of the polydiorganosiloxane urea containing component is formed.

When mixing organic polymers that are non-thermoplastic elastomeric materials with polydiorganosiloxane urea containing components, the former generally needs special conditions to be melt processed. Two methods of making non-thermoplastic elastomeric materials melt processable are (1) reducing their apparent melt viscosity by swelling them with tackifying or plasticizing material or (2) masticating the materials as described in U.S. Pat. No. 5,539,033, which is incorporated herein by reference.

Four process considerations can affect the final properties of the mixtures made by the solventless process. First, the properties the of polydiorganosiloxane urea containing component are affected by whether the polydiorganosiloxane urea containing component is made in a solvent or an essentially solventless process. Secondly, the polydiorganosiloxane urea containing component can degrade if exposed to too much heat and shear. Thirdly, the stability of the mixture is affected by how the polydiorganosiloxane urea containing component is mixed with the organic polymer. Fourthly, the morphology of the article made with the mixture is determined by the interaction of the processing parameters and characteristics of the components in the mixture.

In the first consideration, the polydiorganosiloxane urea containing component can be made previously by either a solvent or solventless process or can be made in the presence of the organic polymer. Methods of making the polydiorganosiloxane urea containing component in solvent were disclosed above. Methods of making the polydiorganosiloxane urea containing component in substantially solventless conditions can result in polydiorganosiloxane urea containing component so high in molecular weight or those with covalent or non-covalent crosslinks that they are insoluble in common organic solvents. The methods can also result in higher molecular weight polydiorganosiloxane urea containing components, particularly when polydiorganosiloxane diamines are used that have a molecular weight in excess of about 20,000.

Secondly, the polydiorganosiloxane urea containing component tends to degrade if it is heated too much under shear conditions, particularly in the presence of oxygen. The polydiorganosiloxane urea containing component is exposed to the least amount of heat and shear when made in the presence of the organic polymer, and in particular, when the mixture is made under an inert atmosphere.

Thirdly, the stability of the mixture is affected by how the polydiorganosiloxane urea containing component is mixed with the organic polymer. Polydiorganosiloxanes are generally immiscible with most other polymeric materials. However, the inventors have found that a wide variety of polymers can be mixed with a polydiorganosiloxane urea containing component when both are in the molten state. Care must be taken that the conditions needed to soften one component does not degrade the other. Preferably, the mixing temperature should be at a temperature above the mixing and conveying temperature of the mixture and below the degradation temperature of the polydiorganosiloxane urea containing component of about 140 to 250° C., more preferably in the range of about 160 to 220° C. Any vessel in which the components can be adequately heated and mixed in the molten state is suitable for making mixtures of the invention.

Fourthly, the processing steps influence the morphology of an article made with the mixtures of the invention. The mixtures generally have at least two domains, one discontinuous and the other continuous, because of the general immiscibility of the polydiorganosiloxane urea containing component with the organic polymer. The component comprising the minor phase typically forms discontinuous domains that range in shape from spheroidal to ellipsoidal to ribbon-like to fibrous. The component comprising the major phase typically forms the continuous domain that surrounds the discontinuous domains. The discontinuous domains of the mixture generally elongate if the mixture is subjected to sufficient shear or extensional forces as the mixture is formed into an article, such as a film or coating. The discontinuous domains generally remain elongated if at least one of the components has a sufficient viscosity at use temperature to prevent the elongated domain from relaxing into a sphere when the mixture is no longer under extensional or shear forces. The elongated morphology is usually stable until the mixture is reheated above the softening point of the components.

While both a solvent based process and a solventless process for making the mixtures of the invention can be used, there may be some situations where a combination of the two is preferred. In the latter case, a polydiorganosiloxane urea containing component could be made by the solvent based process and subsequently dried and melt mixed with the organic polymer.

Types of Articles

The compositions of the present invention, depending on specific formulation, can be used to make a variety of articles. Composition of the present invention used for example as release films, pressure-sensitive adhesive tapes, pressure-sensitive adhesive transfer tapes, pressure-sensitive adhesive medical tapes, including for example transdermal drug delivering devices, or pressure-sensitive adhesive coatings directly onto desired articles.

Pressure-sensitive adhesive articles are made by applying the pressure-sensitive adhesive by well known hot melt or solvent coating process. Any suitable substrates that can by used, including, but not limited to, for example, cloth and fiber-glass cloth, metallized films and foils, polymeric films, nonwovens, paper and polymer coated paper, and foam backings. Polymer films include, but are not limited by, polyolefins such as polypropylene, polyethylene, low density polyethylene, linear low density polyethylene and high density polyethylene; polyesters such as polyethylene terephthalate; polycarbonates; cellulose acetates; polyimides such as KAPTON™. Nonwovens, generally made from randomly oriented fibers, include, but are not limited by, nylon, polypropylene, ethylene-vinyl acetate copolymer, polyurethane, rayon and the like. Foam backings include, but are not limited by acrylic, silicone, polyurethane, polyethylene, neoprene rubber, and polypropylene, and may be filled or unfilled. Backings that are layered, such as polyethylene-aluminum membrane composites, are also suitable.

In the case of pressure-sensitive tapes, these materials are typically applied by first making a tape construction which comprises a layer of the pressure-sensitive adhesive material coated on a backing. The exposed surface of the pressure-sensitive adhesive coating may be subsequently applied to a surface from which it could be released later or directly to the desired substrate.

Some pressure-sensitive adhesive articles use release liners, i.e., transfer tapes that can be made by coating the composition between two liners both of which are coated with a release coating. The release liners typically comprise polymeric material such as polyester, polyethylene, polyolefin and the like, or release coated paper or polyethylene coated paper. Preferably, each release liner is first coated or primed with a release material for the adhesive materials utilized in the invention. When the mixture contains a significant amount of a tackified polydiorganosiloxane urea containing component, useful release liners include those that are suitable for use with silicone adhesives. One example is the polyfluoropolyether coated liner described in European Patent Publication No. 433070. Other useful release liner release coating compositions are described in European Patent Publication No. 378420, U.S. Pat. No. 4,889,753, and European Patent Publication No. 311262. Commercially available liners and compositions include Dow Corning SYL-OFF™ Q2-7785 fluorosilicone release coating, available from Dow Corning Corp., Midland, Mich., X-70-029NS fluorosilicone release coatings available from Shin-Etsu Silicones of America, Inc., Torrance, Calif.; S TAKE-OFF™ 2402 fluorosilicone release liner from Release International, Bedford Park, Ill. and the like.

The compositions of the present invention are also useful in medical applications including transdermal drug delivery devices. Transdermal drug delivery devices are designed to deliver a therapeutically effective amount of drug through or to the skin of a patient. Transdermal drug delivery provides significant advantages; unlike injection, it is noninvasive; unlike oral administration, it avoids hepatic first pass metabolism, it minimizes gastrointestinal effects, and it provides stable blood levels.

A variety of transdermal drug delivery devices have been described. Devices known to the art include matrix devices in which the drug is placed within a nonadhesive polymeric material; reservoir devices in which the drug is placed in a liquid and delivered to the skin through a rate controlling membrane; drug-in-adhesive devices in which the drug is placed within an adhesive polymer; and more complex multilaminate devices involving several distinct layers, e.g. layers for containing drug, for containing excipients, for controlling the rate of release of the drug and excipients, and for attaching the device to the skin.

All of the devices incorporate a drug formulation, an adhesive to maintain contact with the patient's skin, a release liner that protects the device during storage and is removed prior to the application of the device to the skin, and a backing that protects the device from external factors while in use.

A matrix device is shown in FIG. 1. Device 10 comprises a backing 12, a matrix 14 containing the drug and optionally excipients, a concentric adhesive layer 16 surrounding the matrix 14, and a release liner 18.

Figure 2:
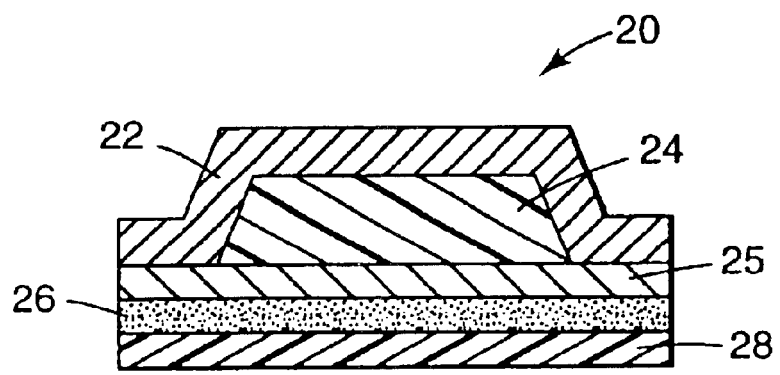
FIG. 2 is a cross-sectional view of a transdermal reservoir device of the present invention.

A reservoir device is shown in FIG. 2. Device 20 comprises a backing 22, a liquid formulation 24 containing the drug and optionally excipients, a membrane 25 for controlling the rate at which the drug and excipients are delivered to the skin, an adhesive layer 26, and a release liner 28. The adhesive layer may also be present as a concentric ring as depicted in connection with the matrix device (FIG. 2).

Figure 3:
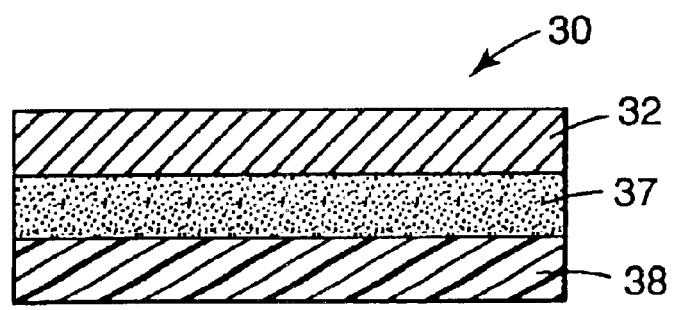
FIG. 3 is a cross-sectional view of a transdermal drug-in-adhesive device of the present invention.

A drug-in-adhesive device is shown in FIG. 3. Device 30 comprises a backing 32, an adhesive layer 37 containing drug and optionally excipients, and a release liner 38.

Figure 4:
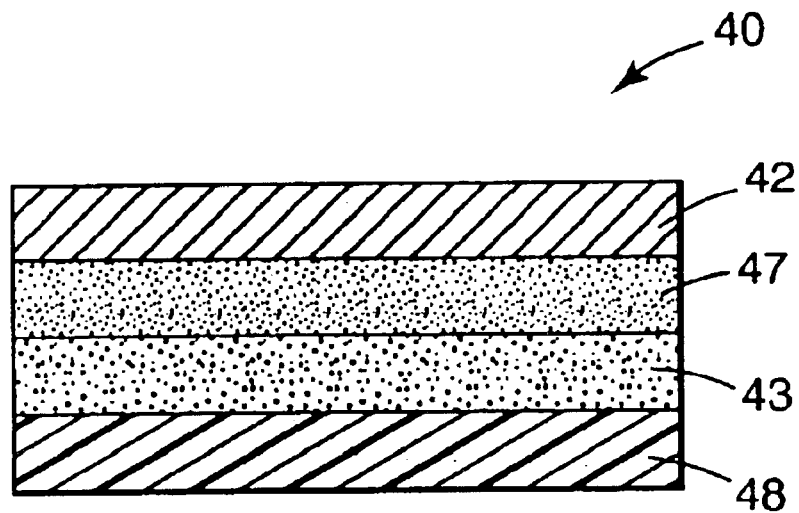
FIG. 4 is a cross-sectional view of a transdermal multilaminate device of the present invention.

A multilaminate device is shown in FIG. 4. Device 40 comprises a backing 42, an adhesive layer 47 containing drug and optionally excipients, a second adhesive layer 43 that controls the rate at which the drug and excipients are delivered to the skin, and a release liner 48.

Figure 5:
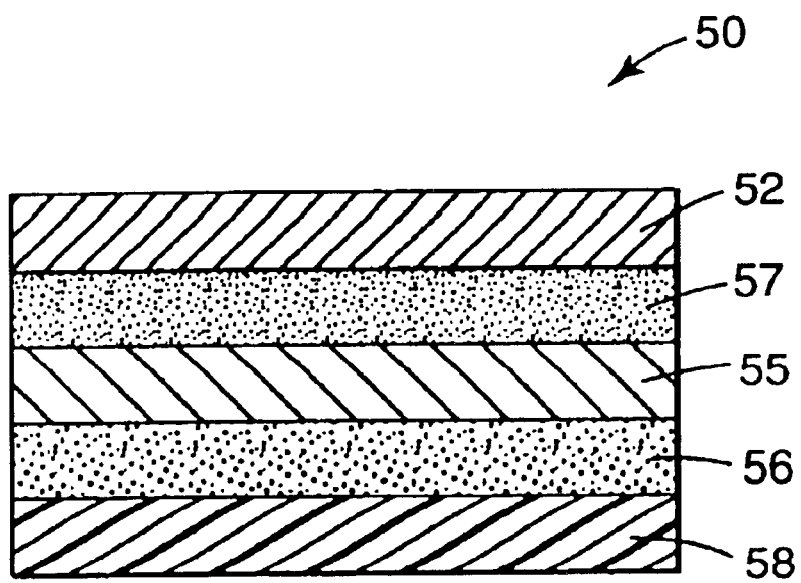
FIG. 5 is a cross-sectional view of an alternative embodiment of a transdermal multilaminate device of the present invention.

A second embodiment of a multilaminate device is shown in FIG. 5. Device 50 comprises a backing 52, an adhesive layer 57 containing drug and optionally excipients, a membrane 55, a second adhesive layer 56, and a release liner 58. The membrane may be selected to control the rate at which the drug and excipients are delivered to the skin or to provide physical stability to the device.

Skin adhesion is a critical requirement of any transdermal drug delivery system. Because drug delivery is directly proportional to the skin contact area, the device must establish and maintain sufficient skin adhesion until it is removed. Adhesives that are used in skin contacting layers will preferably exhibit the following properties: good initial skin adhesion, i.e. tack; adequate adhesion during the wear period; clean release from the skin; and skin compatibility (nonirritating and nonsensitizing). It is important that these properties be maintained when the adhesive is exposed to the particular drug and excipients being used in a given device.

Adhesives used in layers that either contain drug and excipients or through which drug and excipients pass must also be compatible with the drug and excipients. Preferably the adhesives will not react chemically with the drug or excipients. In many instances, it is also preferable that the drug be dissolved in the adhesive rather than dispersed in it. It will often be desirable or even necessary to customize the adhesive for a particular drug/excipient combination.

The transdermal delivery devices can be made in the form of an article such as a tape, a patch, a sheet, a dressing or any other form known to those skilled in the art. Generally the device will be in the form of a patch of a size suitable to deliver a preselected amount of the drug. Suitable release liners include those enumerated above in connection with the preparation of pressure-sensitive adhesive articles.

The compositions of the present invention are also useful for adhering pavement marking sheet materials and pavement markers to pavement surfaces such as concrete and asphalt. Pavement marking sheet materials generally comprise a top layer, a composite laminate layer, and an adhesive layer or layers for adherence to pavement. The materials for the top layer and the adhesive should be selected such that they bond strongly enough together to resist delamination under conditions to which the pavement marking is exposed. The top layer is typically a flexible polymeric layer which is preferably durable and wear resistant. Illustrative examples of materials from which top layers may be made include but are not limited to polyvinyls, polyurethanes, epoxy resins, polyamines, polyureas, and polyesters. Mixtures of such materials may also be used. Suitable polymeric materials may be either thermoplastic or non-thermoplastic elastomeric polymers.

Generally, the top layer also comprises a plurality of retroreflective particles and/or skid resistant particles embedded in the top layer with some particles protruding from the top surface. A base sheet may optionally be applied to the lower surface of the top layer to impart desired conformability and strength. The base sheet may contain particulate fillers to reduce cost and modify properties such as surface hardness or flexibility. Pigments may optionally be added to the top layer or the base sheet to impart desired coloration.

The pavement marking sheet materials generally have a layer of rubber/resin adhesive applied to the lower surface for adherence to pavement. The pressure-sensitive adhesive mixtures of the invention may be applied directly to the lower surface of the top layer if no base layer is present or it may be applied to the lower surface of the base layer, if present. Further, the adhesive can be advantageously applied to the lower surface of the rubber resin pressure-sensitive adhesive.

The polydiorganosiloxane urea containing component polymer mixtures are preferably applied as a 100% solids hot-melt coatable composition and may be applied by various methods including knife coating or extrusion coating. Alternatively, the pressure-sensitive adhesive of the invention is formed as an adhesive layer between release coated liners, i.e., a transfer tape. One release coated liner is removed and the adhesive is adhered to the top layer, base layer or rubber resin pressure-sensitive adhesive of the pavement marking material as appropriate. The other release liner, now on the lower surface of the pavement marking material may then be removed before application to a pavement surface.

The pavement marking sheet materials of the present invention possess excellent adhesion to various pavement surfaces, stable peel force values over time, and excellent performance over broad temperature ranges and under high moisture conditions.

The composition of the present invention may also be used in pressure-sensitive adhesives that readily attach to prepared and unprepared surfaces, especially metals, providing a highly conformable, continuous interfacial silicone coating that prevents ingress of environmental contaminants that corrosively attack unprotected surfaces. The invention addresses a market need for a protective coating which can be applied outside of controlled laboratory or factory conditions. The coating will adhere to cold, wet or rusty metal as well as to existing protective coatings such as epoxy, polyethylene and polypropylene on oil and gas pipelines. A non-exhaustive list of applications includes: permanent repair of coating defects or holidays; coating of pipe ends which have been stripped for joining; protection of parts which must be bare before in-field assembly; a removable means of preventing flash rust of bare metal before further processing; and as a protective adhesive between adjacent coated or uncoated steel parts, as in a rebar mat.

A pressure sensitive adhesive patch typically consists of a protective polydiorganosiloxane urea-containing pressure sensitive adhesive mixture and optionally a barrier or edge adhesive, layers of conformable barrier or backing materials, or combinations of these materials. For some applications it is preferable that the backing does not shield electric field lines, making an open structure backing more preferable to solid films of, for example, polyethylene or PVC. A tapered or profiled adhesive layer to better match surface topology may be preferred when patching some surfaces.

The composition of the present invention may also be used as pressure-sensitive adhesives or hot melt adhesives for heat shrink tubes. These constructions provide a single article that can withstand the high temperatures experienced during the heat shrink operation and provide an environmental seal after cooling. The rheology, heat stability, tack, and clarity of these materials make them especially suitable for this application.

The compositions of the invention can also be coated onto a differential release liner; i.e., a release liner having a first release coating on one side of the liner and a second release coating coated on the opposite side. The two release coatings preferably have different release values. For example, one release coating may have a release value of 5 grams/cm (that is, 5 grams of force is needed to remove a strip of material 1 cm wide from the coating) while the second release coating may have a release value of 15 grams/cm. The material can be coated over the release liner coating having the higher release value. The resulting tape can be wound into a roll. As the tape is unwound, the pressure-sensitive adhesive adheres to the release coating with the higher release value. After the tape is applied to a substrate, the release liner can be removed to expose an adhesive surface for further use.

Hot melt adhesives are compositions that can be used to bond nonadhering surfaces together into a composite. During application to a substrate, hot melt adhesives should be sufficiently fluid to wet the surface completely and leave no voids, even if the surface is rough. Consequently, the adhesive must be low in viscosity at the time of application. However, the bonding adhesive generally sets into a solid to develop sufficient cohesive strength to remain adhered to the substrate under stressful conditions.

For hot melt adhesives, the transition from fluid to solid may be accomplished in several ways. First, the hot melt adhesive may be a thermoplastic that softens and melts when heated and becomes hard again when cooled. Such heating results in sufficiently high fluidity to achieve successful wetting. Alternatively, the hot melt adhesive may be dissolved in a solvent or carrier that lowers the viscosity of the adhesive sufficiently to permit satisfactory wetting and raises the adhesive viscosity when the solvent or carrier is removed. Such an adhesive can be heat activated, if necessary.

The compositions of the present invention may also be used as vibration damping materials alone, that is, free layer treatment, or in conjunction with a stiff layer, that is, as part of a constrained-layer treatment. Vibration damping materials are most efficiently used if they are sandwiched between the structure/device to be damped and a relatively stiff layer, such as thin sheet metal. This forces the viscoelastic material to be deformed in shear as the panel vibrates, dissipating substantially more energy than when the material deforms in extension and compression, as occurs in a free layer treatment. Preferably, constrained-layer constructions consist of a laminate of one or more stiff layers and one or more layers of the vibration damping material.

Constrained-layer constructions can be prepared by several processes. In one process, a layer of the vibration damping material is coated onto a release liner by conventional solution coating or hot melt coating techniques known in the art. The layer of resulting viscoelastic material is transferred to a stiff backing and adhered thereto, thereby providing a constrained-layer construction. In another process, a layer of vibration damping material is coated directly onto a stiff backing by conventional solution coating or hot melt coating techniques known in the art. In each case, the constrained-layer construction is then affixed to the structure requiring damping. The construction may be attached in any manner provided that the constraining layer is only fixed to the vibrating structure via the viscoelastic material interface, i.e. free of mechanical attachment. When the structure subsequently vibrates under the influence of an internally or externally applied force, the vibration is damped.

Another application of the vibration damping materials of the present invention is in a bi-directional damping unit such as described in Neilsen, E. J. et al, "Viscoelastic Damper Overview For Seismic and Wind Applications," Structural Engineering Association of California, Tahoe Olympiad, October, 1994. Bi-directional, or large displacement, damping is the transference of subsonic oscillations of a structure, such as a building, into the shear deformation of a viscoelastic material for the purpose of damping the oscillations of the structure. In this application, materials which have maximum vibration damping capability preferably have shear storage moduli, G', between about $6.9 \times 10^3$ Pa to $3.45 \times 10^7$ Pa, more preferably $3.45 \times 10^4$ Pa to $1.4 \times 10^7$ Pa, most preferably $3.45 \times 10^5$ Pa to $6.9 \times 10^6$ Pa at the use temperature, and have a tan $\delta$ as high as possible over the use temperature and frequency range. The materials also preferably have an elongation in tension of at least 100 percent or a shear strain capability of at least 100 percent within their use range of temperature and frequency.

When the vibration damping material has pressure-sensitive adhesive properties, the material can usually be adhered to a stiff layer without the use of an additional bonding agent. However, it is sometimes necessary to use a thin layer, for example, 20–50 $\mu$m in thickness, of a high strength adhesive, such as, for example, an acrylic adhesive, an epoxy adhesive, or a silicone adhesive, all of which are well-known to those skilled in the art, to bond the vibration damping composition of the invention to a structure.

For most applications, the layer of vibration damping material has a thickness of at least 0.01 mm up to about 100 mm, more preferably 0.05 to 100 mm. The damping material can be applied by any of the techniques known in the art such as by spraying, dipping, knife, or curtain coating, or molding, laminating, casting, or extruding.

As mentioned above, a stiff layer is an essential part of constrained-layer vibration-damping constructions of the present invention. A suitable material for a stiff layer preferably has a stiffness of at least about 100 times the stiffness, i.e., storage modulus, of the vibration damping material, the stiffness of the stiff layer being measured in extension. The desired stiffness of the stiff layer can be varied by adjusting the thickness of this layer, for example, from about 25 micrometers to 5 centimeters, depending on the modulus of the stiff layer. Examples of suitable stiff materials for use in a constrained-layer construction include, for example, metals such as iron, steel, nickel, aluminum, chromium, cobalt, and copper, and alloys thereof and stiff polymeric materials such as polystyrene; polyester, polyvinyl chloride; polyurethane; polycarbonate; polyimide; and polyepoxide; fiber-reinforced plastics such as glass fiber-reinforced, ceramic fiber-reinforced, and metal fiber-reinforced polyester; glasses; and ceramics.

The vibration damping compositions of the present invention are useful in a variety of applications that demand effective damping over a broad range of temperature and frequency, with the additional requirement that minimum and/or maximum modulus requirements, over a specified range of temperatures, also be satisfied. It is often desirable that the region of maximum damping, that is, the point at which the loss factor is near a maximum occurs in the center of the desired damping temperature and frequency range. Designing the optimum damping material for a specific application requires understanding the effect the polydiorganosiloxane urea segmented copolymer, the organic polymer, the silicate resin, optional polydiorganosiloxane oligourea segmented copolymer and filler, and concentration of each have on damping performance.

Compositions of the invention, dependent on specific formulation used, can be pressure-sensitive adhesive materials, heat activated adhesives, vibration damping materials, and non-adhesive materials. To employ non-adhesive vibration damping materials requires the use of a bonding agent, that is, a material to affix the damping material to either a constraining layer and/or a resonating structure depending on the particular use geometry desired.

In the case of vibration damping materials providing pressure-sensitive adhesive properties, these materials are typically applied by first making a tape construction which comprises a layer of the vibration damping material coated between two liners at least one of which is coated with a release material. The vibration damping materials of the invention having pressure-sensitive adhesive qualities and adhere well to polyesters, polycarbonates, polyolefins such as polyethylene and polypropylene, and TEFLON™ of which the latter two classes of materials are traditionally known to be difficult materials to bond with adhesives.

This invention is further illustrated by the following examples that are not intended to limit the scope of the invention. In the examples all parts and percentages are by weight unless otherwise indicated. All molecular weights reported are number average molecular weights in grams/mol.

Test Methods

The following test methods were used to characterize the polydiorganosiloxane urea containing components produced in the following examples:

Mechanical Properties

The polydiorganosiloxane urea containing components were tested for mechanical properties by preparing a 10% solution of the copolymer in tetrahydrofuran or 50/50 toluene/isopropanol and pouring the solution into a Petri dish. The solvent was allowed to evaporate to produce films from about 0.4 to 1.5 mm thick.

Mechanical testing was performed on an INSTRON™ Model 1122 tensile tester. Testing was performed according to a modification of ASTM D412-83. Samples were prepared according to Method B (cut ring specimens). Type 1 rings (5.1 cm circumference) were produced with a specially-designed precision ring cutter. The INSTRON™ analog output signal was routed to a digital voltmeter with accuracy better than 0.5% and the digital readings were recorded by a computer. Modifications to the ASTM test were as follows: the crosshead speed was 12.7 cm/min; the test fixture shafts (upper and lower jaw) rotated at 30 rpm in the same direction to maintain uniform strain throughout the entire ring. Modulus, maximum stress and elongation at break were then calculated.

180° Peel Adhesion

Polydiorganosiloxane urea containing component based pressure-sensitive adhesive coatings on polyester film were covered with a release liner and cut into 12.7 mm (0.5 inch) by 15 cm (6 inch) strips. The release liner was removed and the strip adhered to a 10 cm (4 inch) by 20 cm (8 inch) clean, solvent washed glass coupon using a 2 kg (4½ pound) roller passed twice over the strip. The bonded assembly dwelled at room temperature for about twenty minutes and was tested for 180° peel adhesion using an I-Mass peel tester at a separation rate of 30.5 cm/minute (12 inches/minute) over a 10 second data collection time. Two samples were tested; the reported adhesion value is an average of the two samples. Preferably, the pressure-sensitive adhesive tapes have an 180° peel adhesion of at least about 5.5 N/dm (5 oz/inch), more preferably at least about 21.8 N/dm (20 oz/inch).

Shear Strength

Polydiorganosiloxane urea containing component based pressure-sensitive adhesive coatings on polyester film were covered with a release liner and cut into 12.7 mm (0.5 inch) by 15 cm (6 inch) strips. The release liner was removed and the strip adhered to a stainless steel panel such that a 12.7 mm by 12.7 mm portion of each strip was in firm contact with the panel and one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus ensuring that only shear forces were measured, in an attempt to more accurately determine the holding power of the tape being tested. The time elapsed for each tape example to separate from the test panel was recorded as the shear strength. Unless otherwise noted, all shear failures reported herein were cohesive failures of the adhesive.

Damping Properties (Storage modulus and Loss factor)

Samples were prepared at a thickness of about 750 μm using one of the following methods:

1) coating a solution of vibration damping material, using a knife coater with orifice set between about 250 to 380 μm, on 50 μm polyethylene terephthalate release liner and drying for 1 minute at 70° C. followed by 10 minutes at 175° C. and laminating several pieces of the resulting vibration damping layer together under pressure through a nip roller to obtain a sample of appropriate thickness, 2) casting a solution of the vibration damping material directly onto a release liner in the bottom of a shallow reservoir and allowing it to dry for at least 2 days at ambient condition to obtain a sample of appropriate thickness, or 3) by melt pressing a sample of the neat vibration damping material between parallel aluminum plates, lined with fluorosilicone coated 50 μm polyethylene terephthalate release liner, at 160° C. to obtain a sample of appropriate thickness.

The storage modulus, G', and the loss factor, tan δ, were determined using a Polymer Laboratories Dynamic Mechanical Thermal Analyzer (DMTA) Mark II and a technique of multiplexing frequency during a thermal scan, i.e., properties were measured while both frequency and temperature were changing. The temperature was varied from −100° C. to 200° C. at a rate of 2° C./minute continuous at a strain setting of 1. Measurements were reported at a frequency of 1.0 Hz and were taken at about 3° C. to 5° C. intervals and interpolated to obtain measurements at 10° C. intervals for reporting purposes.

In these examples, the storage modulus, G', utility window refers to the temperature range over which the storage modulus is between $3.45 \times 10^5$ Pa and $6.9 \times 10^6$ Pa. The loss factor, tan δ, utility window refers to the temperature range over which the loss factor is greater than or equal to 0.4. The useful temperature range refers to the temperature range over which storage modulus, G', is between $3.45 \times 10^5$ Pa and $6.9 \times 10^6$ Pa and the loss factor, tan δ, is greater than 0.4. When so indicated, melt flow means the sample exhibited melt flow at high temperature. Melt flow is generally undesirable for damping applications. Thus, materials that exhibit melt flow must be utilized below the melt flow temperature.

In the following examples, all polyisocyanates were used as received and the isocyanate:amine ratios for the polyisocyanates, polyamines, were calculated using the polyisocyanate molecular weight reported by the polyisocyanate supplier, and the polyamine molecular weight as determined by acid titration.

EXAMPLES

In the following Examples, all diisocyanates were used as received and the diisocyanate:diamine ratios were calculated using the diisocyanate molecular weight reported by the diisocyanate supplier and the diamine molecular weight as determined by acid titration. In the Examples all parts and percentages are by weight unless otherwise indicated. All polydiorganosiloxane diamines were made in a manner similar to that disclosed in U.S. Pat. No. 5,512,650 with various molecular weights. All molecular weights reported are number average molecular weights in grams/mole.

Examples 1–4 and Comparative Examples C1–C2

The films of Examples 1–4 contained a polydiorganosiloxane urea containing component and various thermoplastic components in different ratios.

In Example 1, polydimethylsiloxane diamine (molecular weight of 50,200) was injected at a rate of 83.2 g/min into zone 2 of a Berstorff ten zone, 40 mm diameter, 1600 mm length, co-rotating twin screw extruder and methylenedicyclohexylene-4,4'-diisocyanate was injected into zone 4 at a rate of 0.709 g/min. Organic polymer, MORTHANE™ PE44-203 (commercially available from Morton International Inc., Chicago, Ill.) in pellet form, was melted in a 19.05 mm diameter single screw extruder and subsequently injected into zone 6 of the Berstorff extruder at a rate of 35.0 g/min. The Berstorff extruder screws rotated at 100 revolutions per minute. The mixture then passed through a metering pump, neck tube and 152 mm wide flat film die. The temperature profile of the Berstorff extruder and die was: zone 1=20° C.; zones 2 through 5=150° C.; zone 6 through 9=180° C.; zone 10=200° C.; endcap melt pump, neck tube and die=180° C. The resultant mixture was extruded out of the die into a film having a thickness of 250 μm (10 mil).

The film of Example 2 was made in a manner similar to Example 1 except the polydiorganosiloxane diamine was added at a rate of 10.5 g/min, the methylenedicyclohexylene-4,4'-diisocyanate was added at a rate of 0.0896 g/min, and the organic polymer was added at a rate of 42.0 g/min.

In Example 3, the polydimethylsiloxane diamine was injected at a rate of 18.9 g/min into zone 2 of a Berstorff six zone, 25 mm diameter, 737.5 mm length, co-rotating twin screw extruder and methylenedicyclohexylene-4,4'-diisocyanate was injected into zone 2 at a rate of 0.0985 g/min. Organic polymer, KRATON™ 1107 (commercially available from Shell Chemical Co, Houston, Tex.) in pellet form, was melted in a 25.4 mm diameter single screw extruder and subsequently injected into zone 4 of the Berstorff extruder at a rate of 18.7 g/min. The Berstorff extruder screws rotated at 75 revolutions per minute. The mixture then passed through a metering pump, neck tube and 152 mm wide flat film die. The temperature profile of the Berstorff extruder was: zone 1=29° C., zone 2=80° C., zone 3=1 50° C., zone 4=180° C., and zones 5, 6, endcap, melt pump, neck tube, and die=200° C. The resultant mixture was extruded out of the die into a film having a thickness of 60 μm (2.4 mil).

The film of Example 4 was made in a manner similar to Example 3 except the polydiorganosiloxane diamine was added at a rate of 9.5 g/min, the methylenedicyclohexylene-4,4'-diisocyanate was added at a rate of 0.0450 g/min, and the organic polymer was added at a rate of 43.2 g/min.

The film of Comparative Example C1 was made in a manner similar to Example 1 except only the organic polymer was fed at a rate of 42 g/min and the film had a thickness of 200 μm (8 mils).

The film of Comparative Example C2 was made in a manner similar to Comparative Example C1 except the organic polymer was KRATON™ 1107 instead of MORTHANE™ PE44-203, the feed rate was 50 g/min and the film thickness was 240 μm (9.5 mils).

All films were tested for tensile modulus, stress at break and elongation at break. The results are shown in Tables 1a and 1b.

TABLE 1a

| Example | modulus (MN/m$^2$) | stress at break (MN/m$^2$) | elongation at break (%) |
| --- | --- | --- | --- |
| 1 | N/A | N/A | N/A |
| 2 | 7.82 | 2.53 | 160 |
| C1 | 16.1 | 5.48 | 360 |
| 3 | 0.39 | 2.7 | 1250 |
| 4 | 0.62 | 8.4 | 1290 |
| C2 | 0.8 | 6.04 | * |

(N/A - not tested)
(* - no break observed)

Two pressure-sensitive adhesive tapes: #375 box sealing tape, #845 Book tape, each available from 3M Co., St. Paul, Minn., were placed against the polydimethylsiloxane polyurea segmented copolymer mixture release surface and rolled with a 1.13 kg. (2.5 lb.) roller. Peel values were determined at a rate of 229 cm/min (90 in/min) and 180° peel angle after samples were maintained for at least 4 hours at 50% relative humidity and 22.2° C. The peeled tape was then placed on glass which had been cleaned thoroughly with ethyl acetate. Readhesion values to the glass were then determined using the same procedure. The readhesion values to the glass were then determined using the same procedure. The readhesion values to glass were compared to adhesions to glass of a strip of the same tape which had been in contact with Comparative Example C1. The percent retention in readhesion to glass of the tape which had contacted the release layer compared to the adhesion of the tape which had contact Comparative Example C1 was calculated. The initial peel values and the percent retention in readhesion are shown in Table 1b.

TABLE 1b

| | Box Sealing 375 | | Book Tape 345 | |
|---|---|---|---|---|
| Example | release (N/dm) | readhesion % | release (N/dm) | readhesion % |
| 1 | 0.4 | 93 | 0.8 | 88 |
| 2 | 5.8 | 94 | 14 | 98 |
| C1 | 11 | 100 | 26 | 100 |

These novel polydimethylsiloxane urea containing mixtures have useful tensile and release properties. Examples 1 and 2 demonstrate lowered adhesion to pressure sensitive adhesives relative to Comparative Example 1, while still possessing excellent readhesion values. Example 4 displays a higher stress at break than the neat polymer, Comparative Example 2.

Examples 5–7 and Comparative Examples C3–C4

The tackified film of Examples 5–7 contained a polydiorganosiloxane urea containing component and a thermoplastic component with either or both tackified.

The tackified film of Example 5 was made in a manner similar to Example 1 except that a different organic polymer and different processing conditions were used. GE Silicones SR1000 tackifying resin was added into zone 1 at a rate of 17.5 g/min, the polydimethylsiloxane diamine was injected into zone 2 at a rte of 17.5 g/min, the methylenedicyclohexylene-4-4'-diisocyanate was injected into zone 4 at a rate of 0.100 g/min, and Kraton™ 1107 was added via a single screw extruder into zone 6 of the twin screw at a rate of 35.0 g/min. The twin screw extruder, gear pump, neck tube, and die were set at 180° C., and the twin screw extruder screws were rotating at 40 revolutions per minute. The resultant mixture was extruded into a 50 thick film on a 50 thick polyester substrate.

In Example 6, a tackified film was produced in a manner similar to that of Example 5, except that hot melt adhesive HL2542X (a Kraton™ based pressure sensitive adhesive available from H. B. Fuller, St. Paul, Minn.) was used at a rate of 35.0 g/min in place of the Kraton™, the twin screw extruder screws rotated at 120 revolutions per minute, and zones 2 through 6 of the twin screw extruder were at 160° C. A 50 thick film of the mixture was also extruded between release liners and subsequently layered several times to a total thickness of 1 mm for dynamic mechanical testing.

In Example 7, a tackified film was produced in a manner similar to that of Example 5 except that no SR1000 was used, the polydimethylsiloxane diamine was fed ar a rate of 35.0 g/min, the methylenedicyclohexylene-4-4'-diisocyanate was fed at a rate of 0.201 g/min, and the twin screw extruder screws rotated at 40 revolutions per minute. A 1 mm thick film was produced as in Example 6 for dynamic mechanical testing.

The tackified film of Comparative Example C3 was made in a manner similar to that of Example 5 except that no organic polymer was added and the flowrates of the three other feedstreams were doubled, and the extruder screws rotated at 120 revolutions per minute A 1 mm thick film was produced as in Example 6 for dynamic mechanical testing.

The tackified film of Comparative Example C4 was made in a manner similar to Example 6 except that only HL2542X was added, at a rate of 50.0 g/min. A 1 mm thick film was produced as in Example 6 for dynamic mechanical testing.

All tackified films that were coated onto polyester were tested for 180° peel adhesion, and shear strength. The results are shown in Table 2.

TABLE 2

| Example | 180° Peel Adhesion (N/m$^2$) | Shear Strength (min) |
|---|---|---|
| 5 | 36 | 3 |
| C3 | CF | 8 |
| 6 | 77 | 10 |
| C4 | 142 | >100 |
| 7 | 15 | 1 |

Useful peel and shear properties are demonstrated by these polydimethylsiloxane urea containing mixtures. In particular, Example 6 shows that by adding another pressure sensitive adhesive to the polydimethylsiloxane urea pressure sensitive adhesive, the shear properties are enhanced over the polydimethylsiloxane urea pressure sensitive adhesive.

Samples that were extruded between release liners and subsequently layered were tested for damping characteristics. The storage modulus, G', and loss factor, tan δ, were determined and are reported in FIG. 6 through FIG. 9, respectively.

Figure 7:
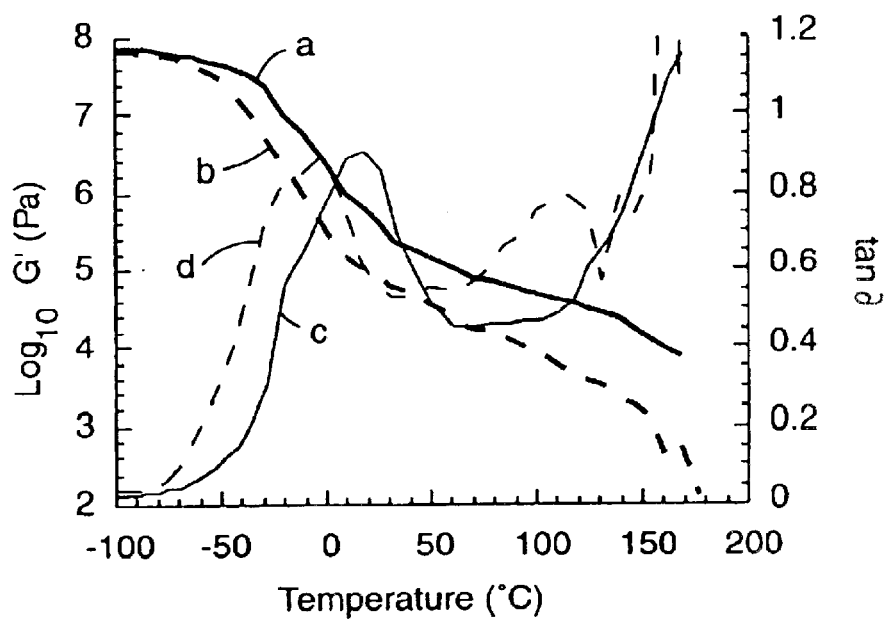
FIG. 7 is a graphical representation of the storage modulus and tan delta as a function of temperature and frequency for Example 6.
Figure 9:
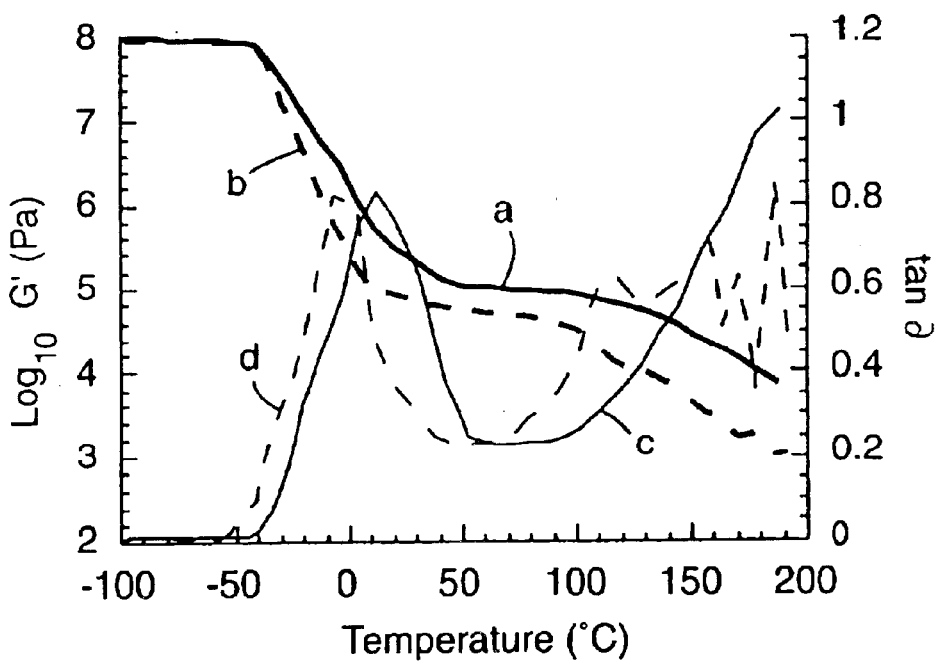
FIG. 9 is a graphical representation of the storage modulus and tan delta as a function of temperature and frequency for Example 7.

These novel polydimethylsiloxane urea containing mixtures have useful energy damping properties. FIGS. 7 and 9 demonstrate that by mixing a tackified polydimethylsiloxane urea or a polydimethylsiloxane urea elastomer with a tackified organic system, a wider range of damping properties can be produced. For instance, the useful temperature range (tan δ>0.4) is broadened by approximately 20° C. over the tackified organic system without adversely affecting the storage modulus.

Figure 6:
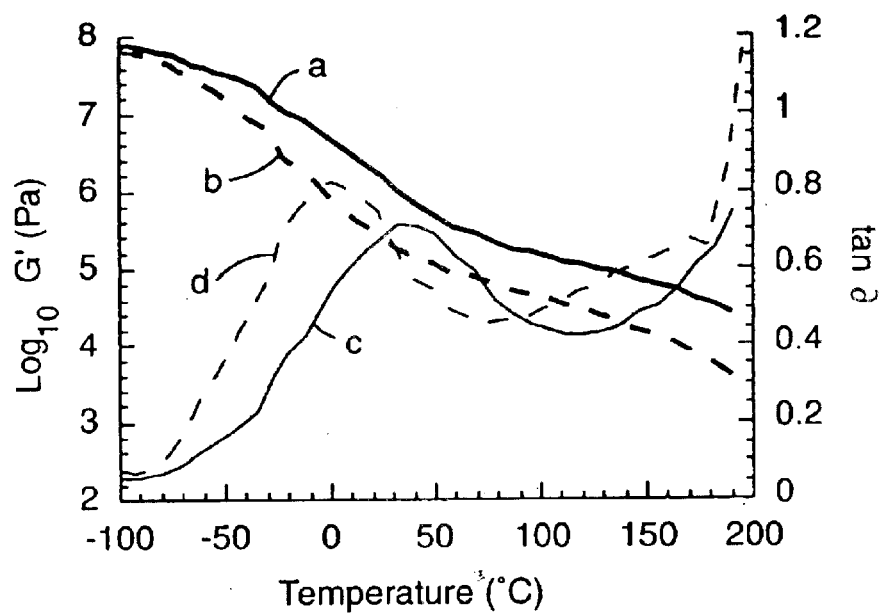
FIG. 6 is a graphical representation of the storage modulus and tan delta as a function of temperature and frequency for Comparative Example 3.

Referring now to the Figures, FIG. 6 is a graphical representation of the storage modulus (thicker lines) and tan delta (thinner lines) as a function of temperature and frequency for Comparative Example 3. The solid lines represent 10 Hz and the dashed lines represent 0.1 Hz.

FIG. 7 is a graphical representation of the storage modulus (thicker lines) and tan delta (thinner lines) as a function of temperature and frequency for Example 6. The solid lines represent 10 Hz and the dashed lines represent 0.1 Hz.

Figure 8:
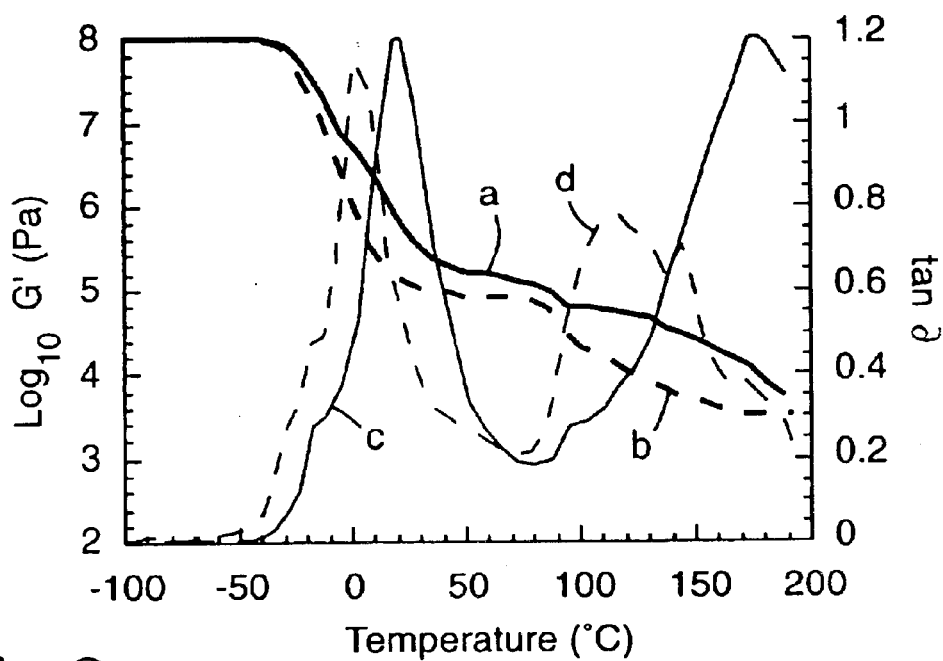
FIG. 8 is a graphical representation of the storage modulus and tan delta as a function of temperature and frequency for Comparative Example 4.

FIG. 8 is a graphical representation of the storage modulus (thicker lines) and tan delta (thinner lines) as a function of temperature and frequency for Comparative Example 4. The solid lines represent 10 Hz and the dashed lines represent 0.1 Hz.

FIG. 9 is a graphical representation of the storage modulus (thicker lines) and tan delta (thinner lines) as a function of temperature and frequency for Example 7. The solid lines represent 10 Hz and the dashed lines represent 0.1 Hz.

Examples 8–12

The tackified films of Examples 8–12 contained tackified polydiorganosiloxane urea containing components having various molecular weights and thermoplastic components.

The tackified film of Example 8 was produced in a manner similar to that of Example 6, except a different organic polymer, different flow rates and processing conditions were used. Organic polymer ENGAGE™ 8200 (commercially available from Dow Chemical Co, Midland, Mich.) was used instead of KRATON™ 1107 and was added at a rate of 15.0 g/min. The tackifying material SR1000, the polydiorganosiloxane diamine and the methylenedicyclohexylene-4,4'-diisocyanate were added at a rate of 30.0 g/min, 30.0 g/min and 0.172 g/min, respectively. The extruder screws rotated at 120 revolutions per minute. Only a 50 μm thick tackified film layer on a polyester substrate was made.

In Example 9, a tackified film was prepared as in Example 8 except the SR1000 and polydiorganosiloxane diamine were each fed at a rate of 17.5 g/min, the methylenedicyclohexylene-4,4'-diisocyanate was fed at a rate of 0.100 g/min, and the Engage 8200 was fed at a rate of 35.0 g/min.

In Example 10, MQ tackifying resin from GE Silicones (11170-002, lot EF002) was fed at a rate of 30.1 g/min into zone 1 of a Berstorff ten zone, 40 mm diameter, 1600 mm length, co-rotating twin screw extruder. Polydimethysiloxane diamine (molecular weight 34,800) was injected at a rate of 29.9 g/min into zone 2, and methylenedicyclohexylene-4,4'-diisocyanate was added at a rate of 0.236 g/min into zone 5. The temperature profile of the Berstorff extruder was: zone 1=85° C., zones 2–5=60° C., zone 6=120° C., and zones 7–10, endcap, and melt pump=180° C. The Berstorff extruder screws rotated at 100 revolutions per minute. This tackified polydiorganosiloxane urea containing component was collected on release liners and cooled. Three parts by weight of this tackified polydiorganosiloxane urea containing component were fed along with one part by weight KRATON™ 1107 into a 19.05 mm diameter single screw extruder. Zone 1 was water cooled, and zones 2 and 3 and the 127 mm wide flat film die were at 200° C. Screw rotation speed was 40 revolutions per minute. The resultant film was 50 $\mu$m thick.

The tackified film of Example 11 was produced in a manner similar to that of the Example 10 except a different polydiorganosiloxane diamine and flow rates were used. Polydimethylsiloxane diamine (molecular weight 105,000) was used at a rate of 44.0 g/min. The MQ resin was fed at a rate of 53.8 g/min and themethylenedicyclohexylene-4,4'-diisocyanate was fed at a rate of 0.121 g/min.

In Example 12, the tackified film was made in a manner similar to that of the Example 10 except a organic polymer Petrothene™ 3150 (a high density polyethylene commercially available from Quantum Chemical Corp., Cincinnati, Ohio) was used.

All tackified films were tested for 180° peel adhesion, and shear strength. The results are shown in Table 3.

TABLE 3

| Example | 180° Peel Adhesion (N/m$^2$) | Shear Strength (min) |
|---|---|---|
| 8 | 58 | 3 |
| 9 | 53 | 2 |
| 10 | 36 | 97 |
| 11 | 61 | 260 |
| 12 | 7 | 220 |

Useful peel and shear properties are demonstrated by these polydimethylsiloxane urea containing mixtures. Examples 8 and 9 demonstrate that up to 50% of a polyethylene-based thermoplastic elastomer in the mixture can still give excellent peel properties. Examples 10 and 11 show that a wide range of silicone diamine molecular weights can be used in producing polydimethylsiloxane urea containing mixtures with good peel and shear properties. Example 12, comprising a polyethylene thermoplastic, possesses useful peel and shear properties.

Examples 13–14 and Comparative Examples C5–C6

Comparative Example 5

A tackified polydimethylsiloxane urea was made in the following manner. MQ tackifying resin was fed into zone 1 of a 40 mm Berstorff twin screw extruder similar to the one used in Comparative Example 1 at a rate of 58.1 g/min. Polydimethylsiloxane diamine, molecular weight 52,000, was injected into zone 2 at a rate of 58.1 g/min. Methylenedicyclohexylene-4,4'-diisocyanate was added into zone 8 at a rate of 0.313 g/min. with the diisocyanate feed line lightly brusing the extruder screws such that each rotation of the screw resulted in a small amount of diisocyanate being taken into the extruder. The screws rotated at 300 revolutions per minute, and the temperature profile of the extruder was: zone 1=28° C., zone 2=100° C., zone 3=71° C., zone 4=77° C., zone 5=87° C., zone 6=78° C., zone 7=85° C., zone 8=77° C., zone 9=117° C., zone 10=144° C., endcap=150° C., and melt pump=180° C. This tackified polydimethylsiloxane urea was then fed into zone 8 of the twin screw extruder of Example 5 with zones 8 through 10, endcap, melt pump, neck tube and die at 180° C. The screws rotated at 40 revolutions per minute. This tackified polydimethylsiloxane urea was coated at 120 $\mu$m onto polyester as in Example 5. Pressure sensitive adhesive testing results are displayed in Table 4.

Example 13

A natural rubber-based pressure sensitive adhesive system was preared by mixing 35.2 parts by weight CV 60 rubber (a natural rubber from Goodyear Chemical, Akron, Ohio), 35.2 parts Escorez™ 1304 (Exxon Chemical Corp., Houston, Tex.), 28.8 parts SYNPOL™ 1011A (Ameripol Synpol), and 0.7 parts IRGANOX™ 1010 (Ciba-Geigy, Hawthorne, N.Y.). The tackified polydimethylsiloxane urea of Comparative Example 5 was dry blended with the natural rubber-based adhesive at a ratio of 90 parts by weight tackified polydimethylsiloxane urea to 10 parts by weight of the natural rubber adhesive. In a manner similar to Comparative Example 6, this tackified blend was then fed into zone 8 of a twin screw extruder and coated onto a polyester backing. Pressure sensitive adhesive testing results are displayed in Table 4.

Example 14

A tackified polymer mixture was prepared as in Example 13, except with 10 parts by weight tackified polydimethylsiloxane urea and 90 parts by weight the natural rubber-based adhesive. The twin screw extruder and die were set to the following temperatures: zones 8 through 10, endcap, melt pump, and neck tube=160° C., and die=180° C. The screw rotated at 50 revolutions per minute. Pressure sensitive adhesive testing results are displayed in Table 4.

Comparative Example 6

A tackified polymer mixture was prepared as in Example 13 except with 100 parts by weight the natural rubber-based adhesive. The twin screw extruder and die were set to the following temperatures: zones 8 through 10, endcap, melt pump, and neck tube=140° C., and die=180° C. The screw rotated at 40 revolutions per minute. Pressure sensitive adhesive testing results are displayed in Table 4.

All tackified films were tested for 180° peel adhesion, and shear strength. The results are shown in Table 4.

TABLE 4

| Example | 180° Peel Adhesion (N/m$^2$) | Shear Strength (min) |
|---|---|---|
| C5 | 91 | 31 |
| 13 | 105 | 27 |
| 14 | 40 | 20 |
| C6 | 73 | 44 |

Mixtures of polydimethylsiloxane urea, thermosets, and tackifiers have very useful peel and shear properties, shown by the data in Table 4. Example 13 possesses an unusually high peel value relative to the Comparative Examples, demonstrating that synergisic properties are obtainable in certain systems.

Examples 15–17 and Comparative Examples C8–C9

The adhesives of the invention can control the rate of drug release from a multilayer transdermal drug delivery device as the procedure described below demonstrates.

The transdermal drug delivery devices of Examples 15–17 and Comparative Examples C6–C9 used as rate control adhesives the tackified films of Example 5–7 and Comparative Examples C4–C5, respectively. In each case, the samples were those made between two release liners and one of the release liners was removed before the samples were used in the procedure described below.

Each test patch consisted of 4 layers: a backing, a first adhesive layer containing drug, a second adhesive layer to provide rate control, and a release liner. Acrylate adhesive copolymer (57.5/39/3.5) isooctyl acrylate/2-hydroxyethyl acrylate/ELVACITE™ (ICI Acrylics) 1020 polymethylmethacrylate macromonomer 50% solids in ethyl acetate) and phenobarbital were combined then mixed to provide a homogeneous coating formulation. The formulation was coated onto a backing (1109 SCOTCHPAK™ tan, polyester film laminate, available from 3M Company) then dried at 43° C. for 15 minutes. The resulting coating contained 5 percent by weight of phenobarbital and had a thickness of 5 mils (127 $\mu$M). The exposed surface was laminated to a layer of rate control adhesive carried on a release liner. Test patches (round, 5 cm$^2$) were die cut from the resulting laminate.

To prevent release of the drug from the periphery of the patch, each test patch was concentrically aligned with an adhesive overlay. An adhesive overlay (round, 25 cm$^2$, 1 mil (25 $\mu$M) layer of polyisobutylene coated onto a backing) was laminated to the backing of the test patch such that the patch and the overlay were concentrically aligned. The release liner was removed from the test patch. A ring-shaped overlay (25 cm$^2$, with an inner diameter of 22 mm, 1 mil (25 $\mu$M) layer of polyisobutylene coated onto a backing) was centered over the test patch/overlay laminate, then the adhesive surfaces were laminated together to provide a seal around the periphery of the test patch. The release liner was placed back on the test patch, then the entire assembly was die cut (round 12.5 cm$^2$) so that the test patch was centered. The assembly was heat sealed in a foil pouch and allowed to equilibrate for 8 days.

The assembly was then removed form the pouch and affixed to one end of a glass plate with double coated tape, so the backing of the assembly was in direct contact with the double coated tape. The release liner was removed from the test patch. The glass slide was suspended in a 120 mL tall form glass jar equipped with a magnetic stirrer. A release solution was prepared by combining 6 L of HPLC grade water; 2.2835 g of sodium phosphate, monobasic monohydrate; 9.7538 g of sodium phosphate, dibasic heptahydrate; and 46.4502 g sodium chloride. Sodium azide (0.04%) was added to the release solution to inhibit bacterial growth during the course of the test. A 100 mL portion of 32° C. release solution was added to the jar. The test patch was completely submerged in the release solution. The jar was capped, then placed in a temperature controlled chamber at 32° C. The release solution was stirred throughout the experiment.

At specified time points (1 hr, 8 hr, 24 hr, 72 hr, and 168 hr), the cap was removed and a 1.0 mL sample of release solution was removed and placed in a HPLC sample vial.

The phenobarbital content of the sample was quantitated using reverse-phase high performance liquid chromatography (Waters LCI Module Plus; column: 15 cm×4.6 mm inner diameter Supelcosil LC-ABZ, 5 $\mu$M particle size; mobile phase: 75% 25 mM potassium phosphate monobasic buffer/25% acetonitrile v/v; flow rate: 2.0 mL/min; detector: uv, 254 nm at 0.005 AUFS; run time: 10 minutes; injection volume 20 $\mu$L).

The percent released was obtained using the following equation:

$$R_i = \frac{\left[ C_i \times (100 - (i-1)) + \sum_{a=1}^{i} C_{n-1} \right]}{(T.C. \times S.A.)} \times 100$$

where:

$R_i$=percent of phenobarbital released from the sample a time point "i"
i=sequential number of time point (values: 1, 2, 3 . . . n)
$C_i$=sample concentration ($\mu$g/mL) from HPLC analysis at time point i
$C_0$=0
T.C.=theoretical phenobarbital content in $\mu$g/cm$^2$
S.A.=surface area of test patch in cm$^2$ The table below shows the identity of the adhesive used in the rate control layer, the thickness of the layer, and the cumulative percent released at each time point. Each value is the average of determinations for three separate test patches. The absence of an entry indicates that a sample was not taken at that time point.

TABLE 5

| | Release Rate of Phenobarbital in Percent | | | | | |
|---|---|---|---|---|---|---|
| Example | Thickness $\mu$m (mils) | 1 hr | 8 hr | 24 hr | 72 hr | 168 hr |
| C8 | 51.0 (2.0) | 0 | 0 | 0 | 0 | 0.6 |
| 21 | 51.0 (2.0) | 0 | 0 | 1.3 | 7 | 18 |
| 22 | 48.3 (1.9) | 0 | 0 | 9 | 9 | 20 |
| 23 | 55.9 (2.2) | 0 | 0 | 0 | 0.6 | 2.5 |
| C9 | 51.0 (2.0) | — | — | — | 14 | 33 |

The results in the Table above show that adhesives of the invention affect the rate at which phenobarbital is released from a multilayer transdermal drug delivery device.

Examples 18–19 and Comparative Example 10
Adhesive Sample Preparation:

In Example 18, 52,900 molecular weight polydimethylsiloxane diamine was added at a rate of 33.5 g/min into the rear portion of zone 1 of a Berstorff ten zone, 40 mm diameter, 1600 mm length, co-rotating twin screw extruder. MQ tackifying resin powder was added at a rate of 40.3 g/min into the forward portion of zone 1. Methylenedicyclohexylene-4,4'-diisocyanate was added into zone 4 at a rate of 0.155 g/min. The temperature profile of the extruder: zone 1=20° C., zones 2 and 3=50° C., zone 4=60° C., zone 5=100° C., zone 6=130° C., zone 7=160° C., zone 8=180° C., and zones 9, 10 and endcap=160° C. The screws rotated at 80 revolutions per minute. Zone 8 was vacuum vented. The material was collected as strands and cooled in air.

Two fully-chain extended RExSi adhesives were used for these experiments. Example 18 was a tackified with 1.2 parts MQ resin for each part of polydimethylsiloxane urea containing elastomer, and Example 19 was tackified with only 1 part of MQ resin for each part of polydimethylsiloxane urea containing elastomer. No flame retardant additives were added.

250 g samples of polydimethylsiloxane urea containing elastomer adhesive were melt-mixed (using a heated (150 C) mixing bowl attachment to a Brabender) with 250 g samples of a flame-retarded blockcopolymer adhesive (HL2886 available from H. B. Fuller, St. Paul, Minn.) for a 2–3 minutes. The partially mixed sample was then homogenized by running it through a 25 mm conical extruder heated to 170° C. operating at 50 rpm.

Comparative Example 10 was a flame-retarded block copolymer adhesive (HL2886 available from H. B. Fuller, St. Paul, Minn.)

The hot-melt adhesive was coated at 250 micron (10 mil) thickness onto SJ-3419 (plain backed flame-retarded hook-tape available from 3M) using a single screw Haake extruder and a draw die. The extruder barrel had three controlled temperature zones set at room temperature, 121° C. (250° F.) and 135° C. (275° F.) respectively. The die temperature was set at 149 C (300 F). The extruder was set at 50 rpm, the barrel was kept full and the web speed was adjusted to yield a uniform coating thickness of 250 micron (10 mils). The cooled adhesive did not require any additional curing step, since both components are physically crosslinked.

The adhesive coated samples were tested for 90 degree peel at 30 cm/min peel rate and 90 degree creep (as described above) on epoxy coated stainless steel panels (BMS 10-11 from Boeing, Seattle, Wash.). Samples were also tested for flame-retardancy.

Vertical Burn Test 5 cm (2") wide and 17.5 cm (7") long test samples are vertically supported at the edge. The specimen is exposed to a Bunsen burner with a nominal 1.2 cm I.D. tube adjusted to give a flame of 3.75 cm (1.5") height. The lower edge of the test sample must be 1.8 cm (¾") above the top edge of the burner. The flame is applied for 60 seconds and removed. Flame time (time sample continues to burn), burn length and flaming time of drippings (time dipping material continues to burn) have to be recorded. A minimum of three test specimens have to be tested and the results have to be averaged.

Creep Test

A 2.54 cm wide and 15.2 cm long sample was laminated to an epoxy coated stainless steel panel (BMS 10-11 from Boeing, Seattle, Wash.) using 8 passes of a 2.5 kg roller. The sample was allowed to dwell for 24 hours at room temperature. The test panel is mounted in horizontal position, a piece of the tape is pulled away and a 908 g weight is attached. With the tape pulling away at 90 degrees from the test panel for one hour, the horizontal displacement of the peel front is measured.

TABLE 6

| Example | 90° peel (N/dm) | Creep (cm) | Flame test |
|---|---|---|---|
| C10 | 70.5 | 1.04 | 12.79 cm burn length No burning drips |
| 18 | 120.4 | 1.9 | 13.3 cm burn length About 8 seconds burning drips |
| 19 | 107.5 | 1.58 | 15.8 cm burn length Little over 5 seconds burning drips |

Replacing 50% of the flame-retarded block copolymer adhesive with non-flame-retarded RExSi adhesive increased the peel performance of the blend without major influence on the flame test performance. Although the flame-test performance deteriorates slightly, we reduce the amount of toxic fumes being generated significantly by eliminating 50% of the flame-retardants.

Examples 20–22

The tackfied films of Examples 20–22 contained a tackified polydiorganosiloxane urea containing component and a different organic polymer at various ratios.

The tackified polydiorganosiloxane urea containing component was first made with 52,900 molecular weight polydimethylsiloxane diamine was added at a rate of 15.5 g/min into zone 1 of a Leistritz 34 mm ten zone counter-rotating fully intermeshing twin screw extruder. MQ tackifying resin powder was added into zone 2 at a rate of 18.4 g/min. Dicyclohexylmethane-4,4'-diisocyanate was added into open zone 6 at a rate of 0.072 g/min with the feed line brushing the screws. The temperature profile for each of the 160 mm long zones was: zone 1=25° C., zone 2=temperature not controlled, zone 3=35° C., zones 4 and 5=50° C.; zone 6=100° C.; zone 7=170° C.; zones 8 through 10=180° C.; and endcap=170° C. The screw speed was 50 revolutions per minute. The material was collected as strands and cooled in air.

In Example 20, 9 grams of the tackified polydiorganosiloxane urea containing component and 34 grams of an acrylic pressure-sensitive adhesive polymer component (95 weight percent isooctylacrylate/5 weight percent acrylic acid, water emulsion polymerized according to U.S. Pat. No. RE 24,906 (Ulrich), which is incorporated herein by reference, and dried) were changed into a 50 gram BRABENDER™ sigma blade mixer operating at 150° C. The components were mixed at about 50 rpm for 3 minutes. A pressure-sensitive film was prepared by placing approximately 1–5 grams of mixed composition between a sheet of release coated paper and a 75 micron thick biaxially oriented polyethylene terephthalate film. This was then placed between two aluminum plates in a hydraulic platen press having two steel plates measuring 152 mm (6 inches) by 152 mm (6 inches). Application of about 28 Mpa (4000 psi) at 138° C. (280° F.) and 12 second dwell time produced pressure-sensitive adhesive coating having thickness of about 100 µm (4 mils).

The tackified films of Examples 21 and 22 were prepared in a manner similar to that of Example 20 except the amounts of tackified polydiorganosiloxane urea containing component and polymer component were 13.5 g/31.5 g and 18 g/27 g, respectively.

The tackified films were tested for 180° peel adhesion to glass. The results are set forth in Table 7.

TABLE 7

| Example | 180° Peel Adhesion N/dm |
|---|---|
| 20 | 10.4 |
| 21 | 9.7 |
| 22 | 17.2 |

The various modifications and alterations of this invention will be apparent to those skilled in the art without departing from the scope and spirit of this invention and this invention should not be restricted to that set forth herein for illustrative purposes only.

What is claimed:

1. A mixture comprising (a) at least one hot melt processable polymer selected from the group consisting of a hot melt processable thermoplastic polymer, a hot melt processable elastomeric thermoset polymer and mixtures thereof, excluding polydiorganosiloxane fluids, and (b) a polymer having (i) soft polydiorganosiloxane units, (ii) hard polyisocyanate residue units, (iii) optionally, soft and/or hard organic polyamine residue units, and (iv) terminal groups.

2. The mixture according to claim 1 wherein the hard polyisocyanate residue units and the hard polyamine residue units comprise less than 50% by weight of polymer (b).

3. The mixture according to claim 1 wherein polymer (b) is represented by the repeating unit:

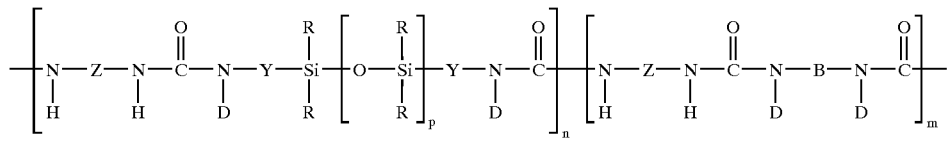

wherein:
- each R is a moiety that: independently is a substituted or unsubstituted alkyl moiety having about 1 to 12 carbon atoms and when R is a substituted alkyl moiety, the substiruents are trifluoroalkyl a vinyl radical or higher alkenyl radical represented by the formula R2(CH$_2$)$_a$CH=CH$_2$ wherein R$^2$ is —(CH$_2$)$_b$— or —(CH$_2$)$_c$CH=CH— and a is 1,2 or 3; b is 0, 3 or 6; and c is 3, 4 or 5 a substituted or unsubstituted cycloalkyl moiety having about 6 to 12 carbon atoms and when R is a substituted c:v"cloalkyl moiety, the substituents are alkyl, fluoroalkyl, or vinyl groups, or a substituted or unsubstituted aryl moiety and when R is a substituted aryl moiety, the substituents are alkyl, cycloalkyl, fluoroalkyl and vinyl groups, or R is a perfluoroalkyl group, a partially fluorinated group, or a perfluoroether-containing group;
- each Z is a polyvalent radical that is an arylene radical or an aralkylene radical having from about 6 to 20 carbon atoms, an alkylene or cycloalkylene radical having from about 6 to 20 carbon atoms;
- each Y is a polyvalent radical that independently is an alkylene radical of 1 to 10 carbon atoms, an aralkylene radical or an arylene radical having 6 to 20 carbon atoms;
- each D is selected from the group consisting of hydrogen, an alkyl radical of 1 to 10 carbon atoms, phenyl, and a radical that completes a ring structure including B or Y to form a heterocycle;
- B is a polyvalent radical selected from the group consisting ot-alkylene, aralkylene, cycloalkylene, phenylene polyalkylene oxide, and mixtures thereof;
- m is a number that is 0 to about 1000;
- n is a numbe-r: that is equal to or greater than 1; and
- p is a numbe, that is about 5 or larger.

4. The mixture according to claim 3 wherein at least 50% of the R moieties of the polydiorganosiloxane urea containing component are methyl radicals with the balance being monovalent alkyl or substituted alkyl radicals, alkenyl radicals, phenyl radicals, or substituted phenyl radicals.

5. The mixture according to claim 3 wherein Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, or 1.4-teyclohexylene.

6. The mixture according to claim 1 wherein polymer (b) is the reaction product of (i) at least one polyamine, wherein the polyamine comprises at least one polydiorganosiloxane diamine, or a mixture of at least one polydiorganosiloxane diamine and at least one orgaIlic polyamine, and (ii) at least one polyisocyanate.

7. The mixture according to claim 1 prepared by the process comprising the steps of:
   - (a) continuously providing to a reactor (i) polymer (a) wherein polymer (a) is not reactive with amine functional groups or isocyanate functional groups, and (ii) reactant components comprising (1) at least one polyisocyanate, and (2) at least one polyamine, wherein the polyamine comprises at least one polydiorganosiloxane diamine or a mixture of at least one polydiorganosiloxane diamine and at least one organic polyamine;
   - (b) mixing polymer (a) and the reactant components within the reactor to form a mixture;
   - (c) allowing reactant components in the mixture to react to form a polydiorganosiloxane urea segmented copolymer; and
   - (d) conveying the polydiorganosiloxane urea segmented copolymer-containing mixture from the reactor.

\* \* \* \* \*

UNITED STATES PATENT AND TRADEMARK OFFICE
CERTIFICATE OF CORRECTION

PATENT NO. : 6,846,893 B1
DATED : January 25, 2005
INVENTOR(S) : Sherman, Audrey A.

It is certified that error appears in the above-identified patent and that said Letters Patent is hereby corrected as shown below:

Title page,
Item [56], U.S. PATENT DOCUMENTS, after "2,672,182 A 4/1954 Daudit et al. 260/448.2" insert -- 2,676,182 A 4/1954 Daudit et al. 260/448.2 --.
OTHER PUBLICAITONS,
"I. Yilgor" reference, delete "Synthesis-Urea" and insert -- Synthesis of Siloxane-Urea --, therefor.
"D. Tyagi" 2nd reference, delete "et al." and insert -- et al., --, therefor.
"M. Kendig" reference, delete "Mode" and insert -- Methods --, therefor.

Column 5,
Line 63, delete "$(CH_2 CHR)_R$" and insert -- $(CH_2 CHR)_x$ --, therefor.

Column 8,
Line 50, after "including" insert -- , --.

Column 9,
Line 29, after "silicate" delete ",".

Column 11,
Line 36, delete "Hills" and insert -- Hüls --, therefor.
Line 43, delete "tetranethylammonium" and insert -- tetramethylammonium --, therefor.

Column 20,
Line 63, delete "polyester," and insert -- polyester; --, therefor.

Column 24,
Line 4, delete "3=1 50°" and insert -- 3=150° --, therefor.

Column 25,
Line 49, after "fed" delete "ar" and insert -- at --, therefor.
Line 59, after "minute" insert -- . --.

Column 27,
Line 6, delete "11170-002" and insert -- 1170-002 --, therefor.

Column 28,
Line 22, delete "preared" and insert -- prepared --, therefor.

Column 29,
Line 49, delete "form" and insert -- from --, therefor.

UNITED STATES PATENT AND TRADEMARK OFFICE
CERTIFICATE OF CORRECTION

PATENT NO. : 6,846,893 B1
DATED : January 25, 2005
INVENTOR(S) : Sherman, Audrey A.

It is certified that error appears in the above-identified patent and that said Letters Patent is hereby corrected as shown below:

Column 30,
Lines 11-14, delete "
$$R_i = \frac{[C_i \times (100 - (i-1)] + \sum_{a-1}^{i} C_{n-1}]}{(T.C. \times S.A.)} \times 100$$
"

and insert --
$$R_i = \frac{[C_i \times [100 - (i-1)] + \sum_{a-1}^{i} C_{n-1}]}{(T.C. \times S.A.)} \times 100$$
--

Column 31,
Line 65, delete "tackfied" and insert -- tackified --, therefor.

Column 33,
Line 14, delete "substiruents" and insert -- substituents --, therefor.
Line 15, delete "R2(CH$_2$)" and insert -- R$^2$(CH$_2$) --, therefor.
Line 18, after "5" insert -- , --.
Line 20, delete "c:v"cloalkyl" and insert -- cycloalkyl --, therefor.
Line 41, delete "ot-alkylene" and insert -- of alkylene --, therefor.
Line 44, delete "numbe-r:" and insert -- number --, therefor.
Line 45, delete "numbe," and insert -- number --, therefor.

Column 34,
Lines 18-19, delete "1.4-teyclohexylene" and insert -- 1,4--cyclohexylene --, therefor.
Line 24, delete "orgall ic" and insert -- organic --, therefor.

Signed and Sealed this

Nineteenth Day of April, 2005

JON W. DUDAS
*Director of the United States Patent and Trademark Office*